US011876848B2

(12) United States Patent
Chen et al.

(10) Patent No.: US 11,876,848 B2
(45) Date of Patent: Jan. 16, 2024

(54) METHOD AND DEVICE FOR DISPLAYING A VIRTUAL LIVESTREAM ROOM, CLIENT, SERVER AND MEDIUM

(71) Applicant: BEIJING BYTEDANCE NETWORK TECHNOLOGY CO., LTD., Beijing (CN)

(72) Inventors: Ye Chen, Beijing (CN); Xinqi Xie, Beijing (CN); Junke Peng, Beijing (CN); Yan Wang, Beijing (CN)

(73) Assignee: BEIJING BYTEDANCE NETWORK TECHNOLOGY CO., LTD.

( * ) Notice: Subject to any disclaimer, the term of this patent is extended or adjusted under 35 U.S.C. 154(b) by 0 days.

(21) Appl. No.: 17/724,122

(22) Filed: Apr. 19, 2022

(65) Prior Publication Data

US 2022/0385710 A1 Dec. 1, 2022

(30) Foreign Application Priority Data

May 28, 2021 (CN) .......................... 202110591745.X

(51) Int. Cl.
*H04L 65/611* (2022.01)
*H04N 21/4788* (2011.01)
(Continued)

(52) U.S. Cl.
CPC .......... *H04L 65/611* (2022.05); *G06F 3/0482* (2013.01); *G06F 3/04817* (2013.01);
(Continued)

(58) Field of Classification Search
CPC ... H04L 65/611; H04L 12/1813; H04L 67/02; G06F 3/04817; G06F 3/0482; H04N 21/2187; H04N 21/4788
(Continued)

(56) References Cited

U.S. PATENT DOCUMENTS 10,321,194 B2 * 6/2019 Lewis ................ H04N 21/4882
11,290,687 B1 * 3/2022 Becchetti ............... H04N 21/44
(Continued)

FOREIGN PATENT DOCUMENTS

CN 106452805 A * 2/2017 ......... H04L 12/1813
CN 107483984 A 12/2017
(Continued)

OTHER PUBLICATIONS

International Search Report dated Jul. 8, 2022 in International Application No. PCT/CN2022/088717.

*Primary Examiner* — Melvin H Pollack

(57) ABSTRACT

The present disclosure relates to a method and a device for displaying a virtual livestream room, a client, a server and a medium. When a user triggers an interactive operation on a livestream page, a client can determine room identifications of one or more virtual livestream rooms to be updated that are bound to the interactive operation, and send the room identifications to a server. The server queries relevant information of virtual livestream rooms corresponding to changes in their room state through the room identifications of the virtual livestream rooms, and sends the relevant information of the virtual livestream rooms to the client, so that the client can quickly locate and modify the relevant information of the virtual livestream rooms, to timely update the virtual livestream rooms on the livestream page, and refresh data of each virtual livestream room.

19 Claims, 22 Drawing Sheets

(51) Int. Cl.
*G06F 3/04817* (2022.01)
*H04N 21/2187* (2011.01)
*G06F 3/0482* (2013.01)
*H04L 12/18* (2006.01)
*H04L 67/02* (2022.01)

(52) U.S. Cl.
CPC .......... *H04L 12/1813* (2013.01); *H04L 67/02* (2013.01); *H04N 21/2187* (2013.01); *H04N 21/4788* (2013.01)

(58) Field of Classification Search
USPC ........................................................ 709/231
See application file for complete search history.

(56) References Cited

U.S. PATENT DOCUMENTS

| | | | | |
|---|---|---|---|---|
| 11,405,687 | B1* | 8/2022 | Pollock | G06V 20/40 |
| 11,462,215 | B2* | 10/2022 | Piernot | G06F 3/167 |
| 11,611,810 | B2* | 3/2023 | Qu | H04N 21/2362 |
| 2014/0118474 | A1* | 5/2014 | Fluhr | H04L 12/1822 348/14.09 |
| 2014/0344286 | A1* | 11/2014 | Si | H04L 65/611 707/748 |
| 2018/0041551 | A1* | 2/2018 | Ormseth | H04L 12/1822 |
| 2019/0321725 | A1* | 10/2019 | Zimring | A63F 13/40 |
| 2019/0325080 | A1* | 10/2019 | Natarajan | G10L 15/26 |
| 2019/0335133 | A1* | 10/2019 | Sharif-Ahmadi | H04N 21/4325 |
| 2019/0342622 | A1* | 11/2019 | Carrigan | H04N 21/47217 |
| 2020/0029128 | A1* | 1/2020 | Erskine | H04N 21/4784 |
| 2020/0298113 | A1* | 9/2020 | Smithers | H04N 21/4312 |
| 2021/0006864 | A1 | 1/2021 | Xu et al. | |
| 2021/0076099 | A1* | 3/2021 | Ganschow | H04N 21/222 |
| 2021/0240909 | A1* | 8/2021 | Ghiaus | G06F 16/9538 |
| 2021/0326494 | A1* | 10/2021 | White | G06N 3/045 |
| 2022/0070504 | A1* | 3/2022 | Hartnett | H04L 12/1827 |
| 2022/0164864 | A1* | 5/2022 | Li | G06Q 30/0631 |
| 2022/0337911 | A1* | 10/2022 | Bayat | H04N 21/812 |
| 2022/0345755 | A1* | 10/2022 | Pollock | G06V 20/41 |
| 2022/0355212 | A1* | 11/2022 | Louden | H04N 21/4826 |

FOREIGN PATENT DOCUMENTS

| | | | | |
|---|---|---|---|---|
| CN | 108769823 A | 11/2018 | | |
| CN | 108810602 A | 11/2018 | | |
| CN | 110740339 A | 1/2020 | | |
| CN | 112468866 A | 3/2021 | | |
| WO | WO-2012145340 A2 * | 10/2012 | ......... | H04L 12/1813 |
| WO | WO-2021055647 A1 * | 3/2021 | ............ | G06F 21/44 |

* cited by examiner

METHOD AND DEVICE FOR DISPLAYING A VIRTUAL LIVESTREAM ROOM, CLIENT, SERVER AND MEDIUM

CROSS-REFERENCE TO RELATED APPLICATIONS

The present disclosure is based on and claims priority to China Patent Application No. 202110591745.X filed on May 28, 2021, the disclosure of which is incorporated by reference herein in its entirety.

TECHNICAL FIELD

The present disclosure relates to a method and a device for displaying a virtual livestream room, a client, a server and a medium.

BACKGROUND

Webcast came into being with the continuous development of the internet technology, which can provide users with abundant recreational activities. Through webcast, the real-time interaction between multiple parties in different places can be realized. Generally, different access addresses (or link addresses) will be allocated to different webcast activities, which are referred to as virtual livestream rooms. Thus, users can enter virtual livestream rooms for viewing and interaction.

SUMMARY

In a first aspect, the present disclosure provides a method for displaying a virtual livestream room, comprising: receiving a first operation performed by a user on a first livestream page; determining a room identification set bound to the first operation, the room identification set comprising room identifications of one or more virtual livestream rooms to be updated; sending the room identification set to a server; receiving a state content set corresponding to the room identification set from the server, wherein the state content set comprises room identifications and relevant information of the one or more virtual livestream rooms to be updated, the relevant information being configured to represent room states and livestream contents of the one or more virtual livestream rooms to be updated, the state content set being determined by the server based on a mapping relationship between the room identifications and the room states, and each of the room states comprising a livestream state and/or a livestream content state of a virtual livestream room; and displaying N virtual livestream rooms in the one or more virtual livestream rooms to be updated on a second livestream page based on the state content set, wherein N is a positive integer.

In some embodiments, the displaying of the N virtual livestream rooms in the one or more virtual livestream rooms to be updated on the second livestream page based on the state content set comprises: determining a page location of each virtual livestream room of the one or more virtual livestream rooms to be updated based on a room state of the each virtual livestream room of the one or more virtual livestream rooms to be updated; selecting the N virtual livestream rooms from the one or more virtual livestream rooms to be updated based on the page location of the each virtual livestream room; obtaining livestream contents corresponding to the N virtual livestream rooms from the state content set; and displaying the N virtual livestream rooms loaded with the livestream contents corresponding to the N virtual livestream rooms on the second livestream page according to page locations of the N virtual livestream rooms.

In some embodiments, the determining of the room identification set bound to the first operation comprises: determining that the room identification set comprises room identifications of virtual livestream rooms bound to a control on the first livestream page, and determining that the one or more virtual livestream rooms to be updated comprises the virtual livestream rooms bound to the control in a case where the first operation is configured to indicate that the control is selected.

In some embodiments, the virtual livestream rooms bound to the control comprises virtual livestream rooms displayed on the first livestream page in a case where the first operation is configured to refresh or load the virtual livestream rooms bound to the control after the control is selected; and the displaying of the N virtual livestream rooms in the one or more virtual livestream rooms to be updated on the second livestream page comprises: displaying M1 virtual livestream rooms that are in an on-livestream state in the virtual livestream rooms bound to the control other than the virtual livestream rooms displayed on the first livestream page and M2 virtual livestream rooms that are in the on-livestream state in the virtual livestream rooms displayed on the first livestream page on the second livestream page, wherein M1+M2=N, M1 and M2 are integers.

In some embodiments, the virtual livestream rooms bound to the control do not comprise the virtual livestream rooms displayed on the first livestream page in a case where the first operation is configured to select the control; the displaying of the N virtual livestream rooms in the one or more virtual livestream rooms to be updated on the second livestream page comprises: displaying N virtual livestream rooms that are in an on-livestream state in the virtual livestream rooms bound to the control on the second livestream page.

In some embodiments, the virtual livestream rooms bound to the control comprise: virtual livestream rooms of all room types, or virtual livestream rooms of the same room type.

In some embodiments, the method further comprises: displaying a virtual livestream room bound to one control in a livestream page on the livestream page, and performing relevant operations to prepare a display of a virtual livestream room bound to a remaining control in the livestream page.

In some embodiments, each virtual livestream room is displayed on a livestream page in a preset style, wherein the preset style comprises: at least one of a card, an icon, text, a picture or a video.

In some embodiments, the method further comprises: determining whether there is a virtual livestream room with a change in livestream content in the N virtual livestream rooms; and updating and displaying the livestream content of the virtual livestream room with the change in the livestream content if there is the virtual livestream room with the change in the livestream content in the N virtual livestream rooms.

In some embodiments, a livestream page and a discovery page are integrated into an integration page, the livestream page being configured to display a virtual livestream room, and the discovery page being configured to display a function set of a client except the virtual livestream room displayed by the livestream page, and the integration page comprises a first option and a second option, the first option being configured to enter the discovery page, and the second option being configured to enter the livestream page; and the method further comprises: switching a display from the livestream page to the discovery page in response to receiving a second operation performed by the user on the first option; and switching the display from the discovery page to the livestream page in response to receiving a third operation triggered by the user on the second option.

In some embodiments, a message page is configured to display a message received by the user in a client, wherein the message page comprises a first control configured to enter a livestream page, the livestream page comprising a second control configured to enter the message page, and the livestream page being configured to display a virtual live broadcast room; and the method further comprises: switching a display from the message page to the livestream page in response to receiving a fourth operation performed by the user on the first control; and switching the display from livestream page to the message page in response to receiving a fifth operation performed by the user on the second control.

In some embodiments, the method further comprises: displaying a livestream page after determining that the user has logged into a client.

In a second aspect, the present disclosure provides a method for displaying a virtual livestream room, comprising: receiving a room identification set bound to a first operation from a client, wherein the first operation is an operation received by the client that is performed by a user on a first livestream page, and the room identification set comprises room identifications of one or more virtual livestream rooms to be updated; determining a state content set corresponding to the room identification set based on a mapping relationship between room identifications and room states, wherein each of the room states comprises a livestream state and/or a livestream content state of a virtual livestream room, the state content set comprises room identifications and relevant information of the one or more virtual livestream rooms to be updated, and the relevant information is configured to represent the room states and livestream contents of the one or more virtual livestream rooms to be updated; and sending the state content set to the client, so that the client displays N virtual livestream rooms in the one or more virtual livestream rooms to be updated on a second livestream page based on the state content set, wherein N is a positive integer.

In some embodiments, the determining of the state content set corresponding to the room identification set based on the mapping relationship between the room identifications and the room states comprises: for each virtual livestream room of the one or more virtual livestream rooms to be updated, performing the following operations: determining a query table set corresponding to the each virtual livestream room based on a room identification of the each virtual livestream room, wherein the query table set comprises at least one query table, each query table storing relevant information of all virtual livestream rooms in the same room state; determining that the state content set comprises the relevant information of the each virtual livestream room based on the query table set corresponding to the each virtual livestream room.

In some embodiments, when livestream states of virtual livestream rooms displayed on the first livestream page are set to an on-livestream state, for each virtual livestream room of the one or more virtual livestream rooms to be updated, the following operations are performed: determining whether the room identification of the each virtual livestream room is stored in a first query table storing room identifications of all virtual livestream rooms whose livestream states have changed from the on-livestream state to an off-livestream state; determining that the state content set comprises the room identification of the each virtual livestream room and the off-livestream state of the each virtual livestream room if the room identification of the each virtual livestream room is stored in the first query table; determining whether the room identification of the each virtual livestream room is stored in a second query table storing room identifications and livestream contents of all virtual livestream rooms whose livestream contents have changed if the room identification of the each virtual livestream room is not stored in the first query table; and determining that the state content set comprises the room identification of the each virtual livestream room and the livestream content of the each virtual livestream room if the room identification of the each virtual livestream room is stored in the second query table.

In a third aspect, the present disclosure provides a device for displaying a virtual livestream room, comprising: a first receiving module configured to receive a first operation performed by a user on a first livestream page; a first determining module configured to determine a room identification set bound to the first operation, the room identification set comprising room identifications of one or more virtual livestream rooms to be updated; a first sending module configured to send the room identification set to a server; wherein the first receiving module is further configured to receive a state content set corresponding to the room identification set from the server, wherein the state content set comprises room identifications and relevant information of the one or more virtual livestream rooms to be updated, the relevant information being configured to represent room states and livestream contents of the one or more virtual livestream rooms to be updated, the state content set being determined by the server based on a mapping relationship between the room identifications and the room states, each of the room states comprising a livestream state and/or a livestream content state of a virtual livestream room; and a display module configured to display N virtual livestream rooms in the one or more virtual livestream rooms to be updated on a second livestream page based on the state content set, wherein N is a positive integer.

In some embodiments, the display module is configured to determine a page location of each virtual livestream room of the one or more virtual livestream rooms to be updated based on a room state of the each virtual livestream room of the one or more virtual livestream rooms to be updated; select the N virtual livestream rooms from the one or more virtual livestream rooms to be updated based on the page location of the each virtual livestream room; obtain livestream contents corresponding to the N virtual livestream rooms from the state content set; and display the N virtual livestream rooms loaded with the livestream contents corresponding to the N virtual livestream rooms on the second livestream page according to page locations of the N virtual livestream rooms.

In some embodiments, the first determining module is configured to determine that the room identification set comprises room identifications of virtual livestream rooms bound to a control on the first livestream page, and determining that the one or more virtual livestream rooms to be updated comprises the virtual livestream rooms bound to the control in a case where the first operation is configured to indicate that the control is selected.

In some embodiments, the virtual livestream rooms bound to the control comprises virtual livestream rooms displayed on the first livestream page in a case where the first operation is configured to refresh or load the virtual livestream rooms bound to the control after the control is selected; and the display module is configured to display M1 virtual livestream rooms that are in an on-livestream state in the virtual livestream rooms bound to the control other than the virtual livestream rooms displayed on the first livestream page and M2 virtual livestream rooms that are in the on-livestream state in the virtual livestream rooms displayed on the first livestream page on the second livestream page, wherein M1+M2=N, M1 and M2 are integers.

In some embodiments, the virtual livestream rooms bound to the control do not comprise the virtual livestream rooms displayed on the first livestream page in a case where the first operation is configured to select the control; the display module is configured to display N virtual livestream rooms that are in an on-livestream state in the virtual livestream rooms bound to the control on the second livestream page.

In some embodiments, the virtual livestream rooms bound to the control comprise: virtual livestream rooms of all room types, or virtual livestream rooms of the same room type.

In some embodiments, the display module is further configured to display a virtual livestream room bound to one control in a livestream page on the livestream page, and perform relevant operations to prepare a display of a virtual livestream room bound to a remaining control in the livestream page.

In some embodiments, the display module is configured to display each virtual livestream room on a livestream page in a preset style, wherein the preset style comprises: at least one of a card, an icon, text, a picture or a video.

In some embodiments, the display module is further configured to determine whether there is a virtual livestream room with a change in livestream content in the N virtual livestream rooms; and update and displaying the livestream content of the virtual livestream room with the change in the livestream content if there is the virtual livestream room with the change in the livestream content in the N virtual livestream rooms.

In some embodiments, a livestream page and a discovery page are integrated into an integration page, the livestream page being configured to display a virtual livestream room, and the discovery page being configured to display a function set in a client except the virtual livestream room displayed by the livestream page, and the integration page comprises a first option and a second option, the first option being configured to enter the discovery page, and the second option being configured to enter the livestream page; and the display module is configured to switch a display from the livestream page to the discovery page in response to receiving a second operation performed by the user on the first option; and switch the display from the discovery page to the livestream page in response to receiving a third operation triggered by the user on the second option.

In some embodiments, a message page is configured to display a message received by the user in a client, wherein the message page comprises a first control configured to enter a livestream page, the livestream page comprising a second control configured to enter the message page, and the livestream page being configured to display a virtual live broadcast room; and the display module is configured to switch a display from the message page to the livestream page in response to receiving a fourth operation performed by the user on the first control; and switch the display from livestream page to the message page in response to receiving a fifth operation performed by the user on the second control.

In some embodiments, the display module is configured to display the first livestream page after determining that the user has logged into a client.

In a fourth aspect, the present disclosure provides a device for displaying a virtual livestream room, comprising: a second receiving module configured to receive a room identification set bound to a first operation from a client, wherein the first operation is an operation received by the client that is performed by a user on a first livestream page, and the room identification set comprises room identifications of one or more virtual livestream rooms to be updated; a second determining module configured to determine a state content set corresponding to the room identification set based on a mapping relationship between room identifications and room states, wherein each of the room states comprises a livestream state and/or a livestream content state of a virtual livestream room, the state content set comprises room identifications and relevant information of the one or more virtual livestream rooms to be updated, and the relevant information is configured to represent the room states and livestream contents of the one or more virtual livestream rooms to be updated; a second sending module configured to send the state content set to the client, so that the client displays N virtual livestream rooms in the one or more virtual livestream rooms to be updated on a second livestream page based on the state content set, wherein N is a positive integer.

In some embodiments, the second determining module is configured to perform the following operations for each virtual livestream room of the one or more virtual livestream rooms to be updated: determining a query table set corresponding to the each virtual livestream room based on a room identification of the each virtual livestream room, wherein the query table set comprises at least one query table, each query table storing relevant information of all virtual livestream rooms in the same room state; and determining that the state content set comprises the relevant information of the each virtual livestream room based on the query table set corresponding to the each virtual livestream room.

In some embodiments, the second determining module is configured to perform the following operations for each virtual livestream room of the one or more virtual livestream rooms to be updated when livestream states of virtual livestream rooms displayed on the first livestream page are set to an on-livestream state: determining whether the room identification of the each virtual livestream room is stored in a first query table storing room identifications of all virtual livestream rooms whose livestream states have changed from the on-livestream state to an off-livestream state; determining that the state content set comprises the room identification of the each virtual livestream room and the off-livestream state of the each virtual livestream room if the room identification of the each virtual livestream room is stored in the first query table; determining whether the room identification of the each virtual livestream room is stored in a second query table storing room identifications and livestream contents of all virtual livestream rooms whose livestream contents have changed if the room identification of the each virtual livestream room is not stored in the first query table; and determining that the state content set comprises the room identification of the each virtual livestream room and the livestream content of the each virtual livestream room if the room identification of the each virtual livestream room is stored in the second query table.

In a fifth aspect, the present disclosure provides a client, comprising: a memory and a processor; wherein the memory is configured to store program instructions; the processor is configured to invoke the program instructions in the memory to cause the client to implement the method for displaying a virtual livestream room in the first aspect and in any embodiment of the first aspect.

In a sixth aspect, the present disclosure provides a server, comprising: a memory and a processor; wherein the memory is configured to store program instructions; the processor is configured to invoke the program instructions in the memory to cause the server to implement the method for displaying a virtual livestream room in the second aspect and in any embodiment of the second aspect.

In a seventh aspect, the present disclosure provides a non-transitory computer storage medium, comprising computer instructions that when executed on an electronic device, cause the electronic device to implement the method for displaying a virtual livestream room in the first aspect and in any embodiment of the first aspect, or the method for displaying a virtual livestream room in the second aspect and in any embodiment of the second aspect.

In an eighth aspect, the present disclosure provides a computer program product that, when executed on a computer, cause the computer to implement the method for displaying a virtual livestream room in the first aspect and in any embodiment of the first aspect, or the method for displaying a virtual livestream room in the second aspect and in any embodiment of the second aspect.

In a ninth aspect, the present disclosure discloses a chip system applied to an electronic device comprising a display, a memory and a sensor, the chip system comprising: a processor; when the processor executes computer instructions stored in the memory, the electronic device implements the method for displaying a virtual livestream room in the first aspect and in any embodiment of the first aspect, or the method for displaying a virtual livestream room in the second aspect and in any embodiment of the second aspect.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present invention or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

DETAILED DESCRIPTION

Figure 1:
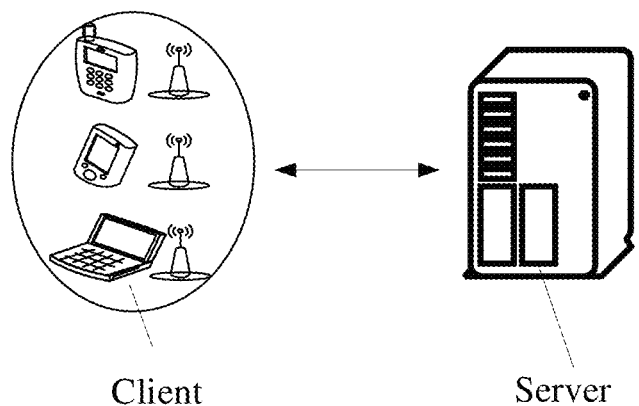
FIG. 1 is a schematic diagram of a communication system provided by an embodiment of the present disclosure.

In order to better understand the above objects, features and advantages of the present disclosure, the scheme of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

As an illustration, the present disclosure provides a method and device for displaying a virtual livestream room, a client, a server, a computer storage medium and a computer program product, which can realize the data interaction between the client and the server by means of room identifications of the virtual livestream rooms, so that the client can obtain the relevant information of one or more virtual livestream rooms that need to be updated from the server, and can update the display of relevant information of the virtual livestream rooms on a livestream page. When a user triggers an interactive operation on a livestream page, a client can determine room identifications of one or more virtual livestream rooms to be updated that are bound to the interactive operation, and send the room identifications of the one or more virtual livestream rooms to be updated to a server. The server queries relevant information of virtual livestream rooms corresponding to changes in their room state through the room identifications of the virtual livestream rooms, and sends the relevant information of the virtual livestream rooms to the client, so that the client can quickly locate and modify the relevant information of the virtual livestream rooms, to timely update the virtual livestream rooms in the livestream page, and refresh data of each virtual livestream room. Thus, the time-consumed process of querying the relevant information of the virtual livestream rooms is optimized, and the load caused by the operating system of the terminal device updating the livestream page is reduced, so that when the user triggers an interactive operation in the livestream page, the client can quickly update the virtual livestream rooms in the livestream page and the relevant information of the virtual livestream rooms, enabling the user to quickly obtain data updates of the virtual livestream rooms, and thereby improving the user's experience of using the application.

The room identification of a virtual livestream room is configured to uniquely identify the virtual livestream room, in the form of Identity Document (ID), for example.

A livestream page is configured to display relevant information of a plurality of virtual livestream rooms. Herein, the term "relevant information" is configured to represent a room state and a livestream content of a virtual livestream room. It can be understood that relevant information may comprise a room state and/or a livestream content of a virtual livestream room.

The room state may comprise a livestream state and a livestream content state. The livestream state may comprise: non-on-livestream, a transition from non-on-livestream to on-livestream, and a transition from on-livestream to off-livestream. The livestream content state comprises livestream content changed and livestream content unchanged, wherein livestream content changed means a change in the livestream picture displayed in a virtual livestream room, a change in questions asked in a virtual livestream room, a change in commodity information exhibited in a virtual livestream room, or the like.

the livestream content can comprise: a livestream picture (i.e. a live stream), and/or a specific content such as a good and a problem in the livestream picture.

The client can maintain the room identifications and relevant information of the virtual livestream rooms, as well as the mapping relationship between the virtual livestream rooms, the room identifications and the relevant information. The server can maintain the room identifications, the room states, the livestream contents of the virtual livestream rooms, as well as the mapping relationship therebetween. The above mapping relationship can be stored in the form of a key-value, a table or an array to facilitate subsequent quick query.

Referring to FIG. 1, a schematic diagram of a communication system provided by an embodiment of the present disclosure is shown. As shown in FIG. 1, the communication system provided in the disclosure comprises: a server and a client, wherein the server and the client can communicate with each other.

The client can implement the method for displaying a virtual livestream room of the present disclosure through an application (APP), an official account, a webpage, etc. in a terminal device. The terminal device can comprise a mobile phone (such as a foldable phone, a smart phone, etc.), a personal digital assistant (PDA), a tablet computer, a notebook computer, an ultra-mobile personal computer (UMPC), a netbook, a wearable electronic device, a smart home device and other devices. The present disclosure does not limit the specific type of the terminal device.

The present disclosure does not limit the type of the operating system of the terminal device. For example, the operating system of the terminal device may be Android, Linux, Windows, IOS system, or the like.

Figure 2:
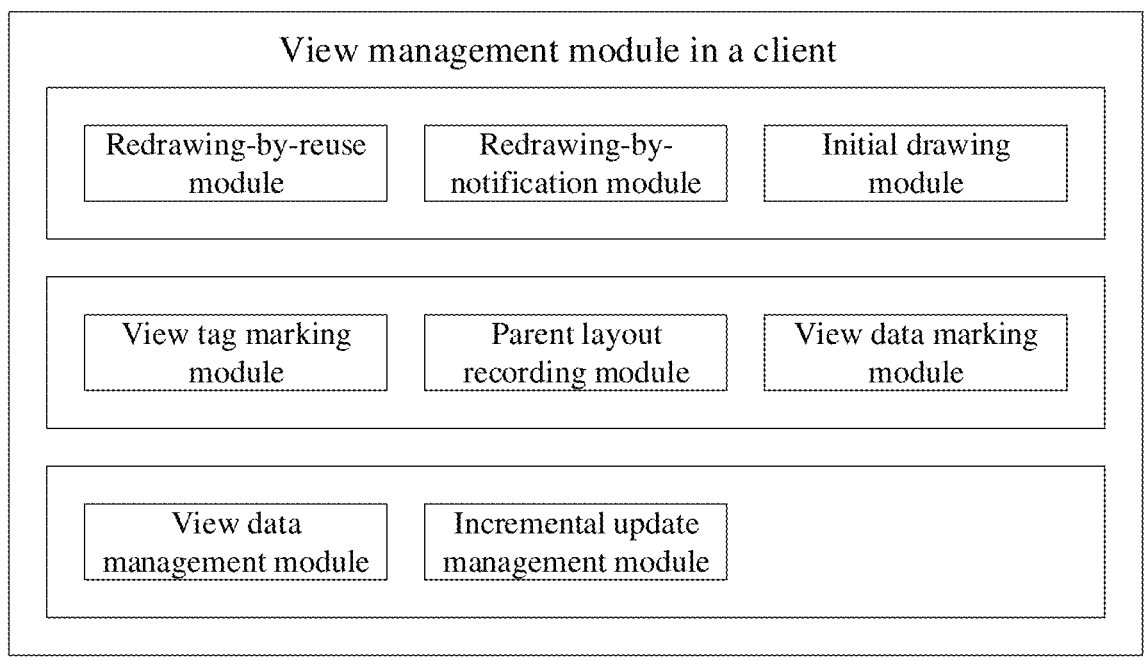
FIG. 2 is a software block diagram of a view management module in the client provided by an embodiment of the present disclosure.

Referring to FIG. 2, a software block diagram of a view management module in the client provided by an embodiment of the present disclosure is shown. In FIG. 2, the view management module in the client is configured to manage the logic of drawing virtual livestream rooms on a livestream page of the client, and can communicate with the operating system of the terminal device to realize the drawing of virtual livestream rooms on a livestream page.

As shown in FIG. 2, the view management module in the client provided by the present disclosure may comprise: a redrawing-by-reuse module, a redrawing-by-notification module, an initial drawing module, a view tag marking module, a parent layout recording module, a view data marking module, a view data management module and an incremental update management module.

The redrawing-by-reuse module is configured to retain reusable parameters such as the style or layout framework of the original virtual livestream room in the livestream page when a livestream page of the client is updated, which is conducive to the rapid drawing of the original virtual livestream room when the livestream page is updated. Furthermore, it discards data such as pictures or videos of the original virtual livestream room in the livestream room, avoiding the waste caused by occupying too many resources of the terminal device.

In some embodiments, taking a mobile phone as the terminal device for example, the screen of the mobile phone displays a virtual livestream room 1 and a virtual livestream room 2 on a livestream page of the client. After receiving an operation instructing to update the livestream page, the redrawing-by-reuse module can retain the parameters (e.g., the style and other parameters) of the virtual livestream room 1 and the virtual livestream room 2, discard data (e.g., video data, etc.) of the virtual livestream room 1 and the virtual livestream room 2, and the screen of the mobile phone displays the updated livestream page.

The redrawing-by-notification module is configured to notify the terminal device/client to draw a virtual livestream room that is not displayed on the screen of the terminal device in the livestream page.

In some embodiments, taking a mobile phone as the terminal device for example, the screen of the mobile phone displays a virtual livestream room 1 and a virtual livestream room 2, a virtual livestream room 3, and a virtual livestream room 4 on a livestream page of the client. After receiving an operation for loading more virtual livestream rooms in the livestream page, the redrawing-by-notification module can notify the mobile phone to draw a virtual livestream room 5 and a virtual livestream room 6, so that the mobile phone's screen can display the virtual livestream room 3, the virtual livestream room 4, the virtual livestream room 5 and the virtual livestream room 6 in the livestream page.

The initial drawing module is configured to notify the terminal device/client to draw a virtual livestream room on a livestream page in a case where the livestream page has not been drawn.

In some embodiments, taking a mobile phone as the terminal device for example, a livestream page of the client is initially not displayed on the screen of the mobile phone. After receiving an operation for displaying a livestream page, the initial drawing module can notify the mobile phone to draw a virtual livestream room in the livestream page, so that the mobile phone's screen can display a virtual livestream room in the livestream page.

The view tag marking module, the parent layout recording module and the view data marking module are configured to mark the virtual livestream room in the livestream page that has a changed room state and is not displayed on the screen of the terminal device, which are conducive to the rapid redrawing of the virtual livestream room whose room state changes when more virtual livestream rooms will be displayed in the livestream page.

The view tag marking module can mark a virtual livestream room itself, the parent layout recording module can mark the virtual livestream room from the perspective of the manager (i.e. global), and the view data marking module can mark the relevant information of the virtual livestream room. Thus, the terminal device/client can be notified to redraw the marked virtual livestream room.

It should be noted that the view management module of the client can mark the virtual livestream room using one of these three modules of the view tag marking module, the parent layout recording module or the view data marking module.

In some embodiments, taking a mobile phone as the terminal device for example, the screen of the mobile phone displays a virtual livestream room 1, a virtual livestream room 2, a virtual livestream room 3, and a virtual livestream room 4 on a livestream page of the client. If the room state of virtual livestream room 5 changes, the view tag marking module can be configured to mark the virtual livestream room 5. After receiving an operation for loading more virtual livestream rooms in the livestream page, the view tag marking module can notify the mobile phone of the need to redraw virtual livestream room 5 based on the mark of the virtual livestream room 5, so that the mobile phone's screen can display the virtual direct room 3, the virtual livestream room 4, the virtual livestream room 5 and the virtual livestream room 6 in the livestream page. In this case, if the room state of the virtual livestream room 1 changes, the view tag marking module can mark the virtual livestream room 1. After receiving an operation for reviewing virtual livestream rooms displayed in the livestream page, the view tag marking module can notify the mobile phone of the need to redraw the virtual livestream room 1 based on the mark of the virtual livestream room 1, so that the mobile phone's screen displays the virtual livestream room 1, the virtual livestream room 2, the virtual livestream room 3 and the virtual livestream room 4 in the livestream page.

The view data management module is configured to manage virtual livestream rooms on a livestream page of the client, which can invoke the redrawing-by-reuse module to determine whether it is necessary to quickly draw the originally displayed virtual livestream room, the redrawing-by-notification module to determine whether it is necessary to draw a virtual livestream room in the livestream page that is not displayed on the screen of the terminal device, the initial drawing module to determine whether to draw a virtual livestream room on a livestream page in a case where the livestream page is not drawn, and at least one of the view tag marking module, parent layout recording module or view data marking module to determine whether to draw the marked virtual livestream room.

The incremental update management module is configured to manage a virtual livestream room whose room state changes on a livestream page of the client. It can invoke the redrawing-by-reuse module to determine whether it is necessary to quickly draw the originally displayed virtual livestream room, and the redrawing-by-notification module to determine whether it is necessary to draw a virtual livestream room in the livestream page that is not displayed on the screen of the terminal device, the initial drawing module to determine whether to draw a virtual livestream room on a livestream page in a case where the livestream page is not drawn, and at least one of the view tag marking module, parent layout recording module and view data marking module to determine whether to draw the marked virtual livestream room.

To sum up, the view management module of the client can decide whether to remove, refresh and load one or more virtual livestream rooms to be updated according to the display strategy of the virtual livestream rooms according to the relevant information such as the room state and/or livestream contents of the virtual livestream rooms in a management livestream page. Through marking the one or more virtual livestream rooms to be updated, the drawing logic of initial display, refreshing, or loading more virtual livestream rooms can be realized, so that the operating system of the terminal device can draw a virtual livestream room on a livestream page according to the corresponding drawing logic.

Based on the above description, in conjunction with Scenario 1 and Scenario 2, and taking a mobile phone as the terminal device on which a client such as a social video clip App (hereinafter referred to as application 1) has been installed, a specific implementation of the method for displaying a virtual livestream room provided by the present disclosure will be introduced below.

Scenario 1 and Scenario 2 respectively show different entrances of a livestream page in the client. Moreover, the present disclosure is not limited to the above two methods to access the livestream page.

Scenario 1

In Scenario 1, the client can integrate a livestream page and a discovery page into an integration page. The livestream page is configured to display a virtual livestream room, and the discovery page is configured to provide a function set of the client other than the virtual livestream room displayed on the livestream page. For example, the discovery page can display a set of two functions of application 1: Hot Topic and Music Recommendation.

Referring to FIGS. 3A to 3H and 4A to 4F, FIGS. 3A to 3H are the schematic diagram of human-computer interaction interfaces provided by an embodiment of the present disclosure, and FIGS. 4A to 4F are the schematic diagram of human-computer interaction interfaces provided by an embodiment of the present disclosure.

1. Entrance of the Livestream Page

Figure 3A:
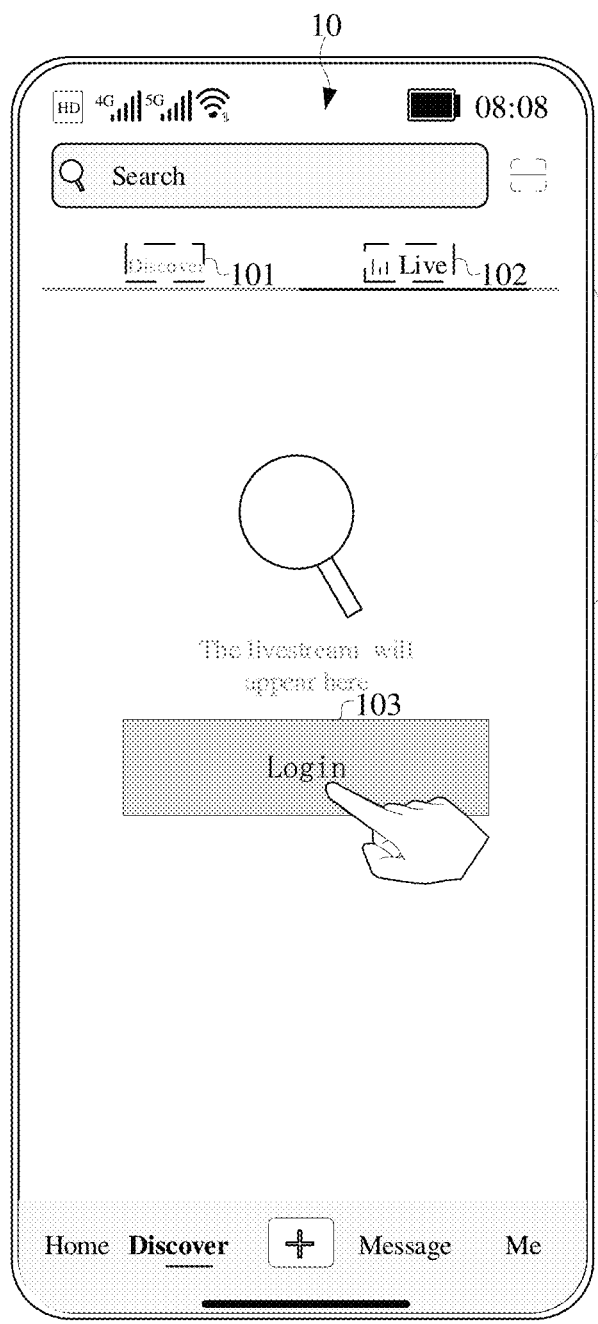
FIGS. 3A to 3H are schematic diagrams of human-computer interaction interfaces provided by an embodiment of the present disclosure.

When the mobile phone is in a portrait state, the screen of the mobile phone can display user interface 10 shown in FIG. 3A, wherein the user interface 10 is configured to display a login interface of the livestream page in application 1.

In FIG. 3A, user interface 10 may comprise a control 101, and a user may trigger the control 101 from the user interface 10. The control 101 is configured to trigger the user's login on application 1 to enter the livestream page.

In addition, the user interface 10 may further comprise options 102 and 103 to indicate that the user can trigger the option 102 or the option 103 from the user interface 10. The option 102 is configured to trigger the display of the discovery page, and the option 103 is configured to trigger the display of the livestream page.

Thus, after the application 1 receives an operation from the user 1 to trigger the option 102 on the user interface 10 shown in FIG. 3A, the application 1 can display the discovery page on the mobile phone. After the application 1 receives an operation from the user 1 to trigger the option 103 on the user interface 10 shown in FIG. 3A, the application 1 can display the livestream page on the mobile phone.

It should be noted that after the option 103 is triggered, the application 1 can directly display the livestream page, or display the livestream page after displaying an intermediate page such as a verification page, which is not limited in the present disclosure. In addition, in addition to the above login method, the user 1 can also log in on other pages of the application 1.

In the present disclosure, virtual livestream rooms displayed in the livestream page may be in several styles.

Next, the display of virtual livestream rooms will be discussed in conjunction with style 1 and style 2, respectively.

In the case where style 1 is a card style, the process of the application 1 displaying the virtual livestream room can comprise:

2.1 Display of a Virtual Livestream Room in Style 1 on Livestream Page

Figure 3B:
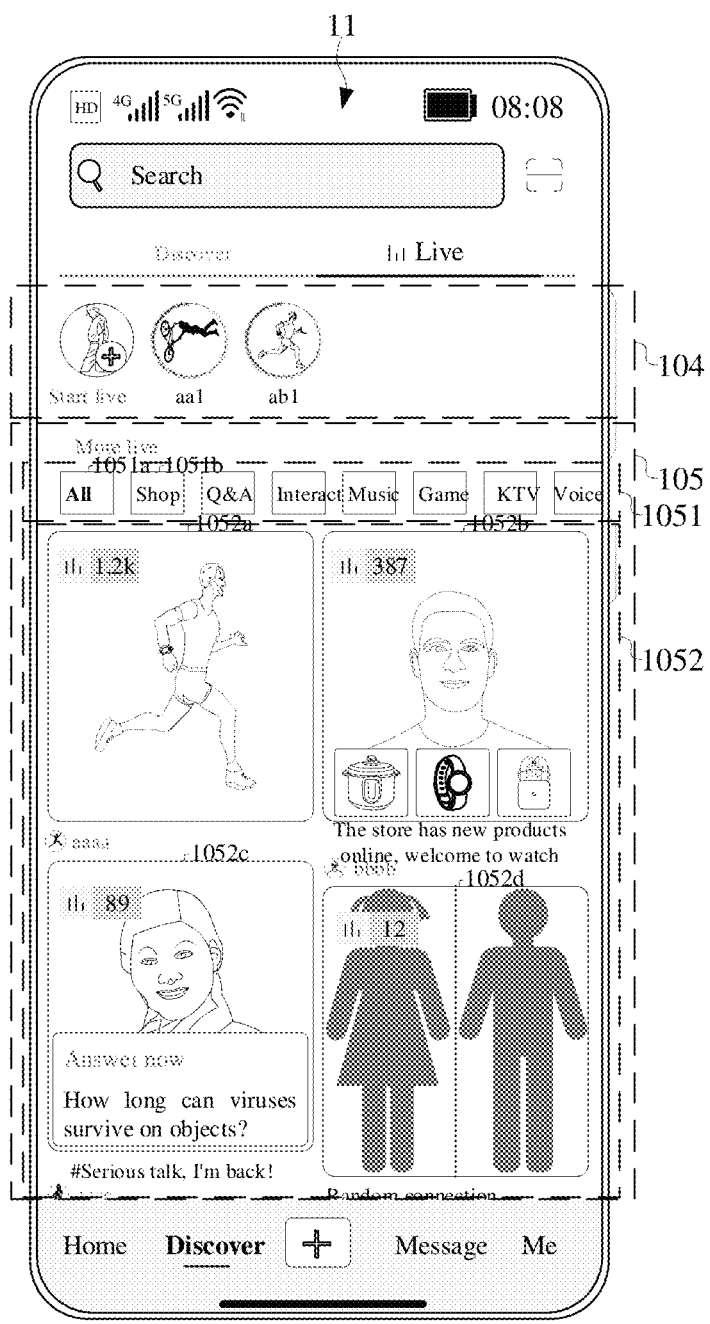

After the application 1 receives an operation from the user 1 to trigger the control 103 on the user interface 10 shown in FIG. 3A, if there is another user followed by the user 1 in the application 1 who is in an on-livestream state (i.e. the virtual livestream rooms of other users), the application 1 can display an exemplary user interface 11 shown in FIG. 3B on the mobile phone; If there is no other user followed by the user 1 in the application 1 who is in the on-livestream state (i.e. the virtual livestream rooms of other users), the application 1 can display an exemplary user interface 12 shown in FIG. 3C on the mobile phone. The user interface 11 and the user interface 12 are configured to display the virtual livestream room in style 1 in the livestream page.

It should be noted that, in addition to displaying the virtual livestream room that is in the on-livestream state, the user interface 11 and the user interface 12 can also display virtual livestream room followed by user 1 in the application 1 that is in an off-livestream state.

In FIG. 3B, the user interface 11 may comprise an area 104 and an area 105.

The area 104 is configured to provide the user 1 with an entrance to request permission for livestreaming, and is configured to display a virtual livestream room of the other user followed by the user 1 in application 1. In some embodiments, the area 104 can display the virtual livestream room of the other user that is in the on-livestream state for fast viewing by the user 1. In addition, the virtual livestream room of the other user in the area 104 can be displayed with identifications such as an account nickname and an account avatar of the other user.

The area 105 is configured to display a plurality of virtual livestream rooms. In some embodiments, the area 105 can display virtual livestream rooms in the on-livestream state. It should be noted that the information of the user involved in this disclosure, such as a browsing record, an account nickname, an account avatar, a cover page, a user action, etc., is obtained by the terminal device/client as desired and approved by the user.

Moreover, the application 1 can classify virtual livestream rooms in area 105 based on the types of the virtual livestream rooms, to quickly show the same type of virtual livestream rooms to the user 1.

In some embodiments, the area 105 comprises an area 1051 and an area 1052.

The area 1051 is configured to display the types of the virtual livestream rooms, such as All type, Shopping type, Question and Answer (Q&A) type, Interaction type (i.e. continuous microphone type), Music type, Game type, KTV type, Voice type, General type, and Other type.

In addition, each type of virtual livestream rooms can be bound to a control, such as a control 1051a and a control 1052b in the area 1051, which are respectively configured to indicate that the user can trigger the control 1051a and the control 1052b from the area 1051. The control 1051a is configured to trigger the display of all types of virtual livestream rooms, and the control 1052b is configured to trigger the display of virtual livestream rooms of the shopping type.

In addition, if the number of controls exceeds a preset value, the area 1051 can display a preset number of controls while hiding other controls exceeding the preset number. The present disclosure can display the hidden controls in a variety of ways. In some embodiments, the area 1051 may be provided with a control, which can be triggered by the user to enable the application 1 to show all controls in the area 1051. In other embodiments, the application 1 may display hidden controls in the area 1051 after the user performs a slide operation in the area 1051.

The area 1052 is configured to display a virtual livestream room set (which can be called a virtual livestream room list) bound to each control in the area 1051 using style 1. For example, if the control 1051a in area 1051 is selected, the area 1052 can display all types of virtual livestream rooms bound to the control 1051a; or if the control 1051b in area 1051 is selected, the area 1052 can display a virtual livestream room set of the shopping type bound to control 1051b. In addition, the selected control can be highlighted or displayed in bold font in area 1051.

Moreover, application 1 can display different data of the virtual livestream rooms based on the type of the virtual livestream rooms comprised in the virtual livestream room set. The virtual livestream rooms comprised in the virtual livestream room set bound to each control can be the same and/or different. The number of the virtual livestream rooms in each virtual livestream room set can be set based on the size of area 1052 on the screen of the mobile phone, which is not limited in the present disclosure.

In some embodiments, as shown in FIG. 3B, if the user 1 selects the control 1051a in the area 1051, the area 1052 may comprise cards 1052a, 1052b, 1052c and 1052d in style 1.

The card 1052a is configured to display the data of a virtual livestream room of the general type, such as the current number of viewers, a cover picture or a real-time livestream picture, a title (which can be displayed in full or abbreviated in text), an account avatar of a corresponding user, a nickname of a corresponding user, an authentication identifier and so on.

The card 1052b is configured to display the data of a virtual livestream room of the shopping type, such as the current number of viewers, a cover picture or a real-time livestream picture, a title (which can be displayed in full or abbreviated in text), an account avatar of a corresponding user, a nickname of a corresponding user, an authentication identifier, information about items on sale in real time (for example, some items are displayed in the selected order and other products are displayed in put-on-sale order in the shopping cart), the number of items on sale in real time, etc.

The card 1052c is configured to display the data of a virtual livestream room of the Q&A type, such as the current number of viewers, a title (which can be displayed in full or abbreviated in text), an account avatar of a corresponding user, a nickname of a corresponding user, an authentication identifier, real-time questions and answers, etc.

The card 1052d is configured to display the data of a virtual livestream room of the interaction type, such as the current number of viewers, a cover picture or a real-time livestream picture, a title (which can be displayed in full or abbreviated in text), an account avatar of a corresponding user, a nickname of a corresponding user, an authentication identifier, an account avatar of an interaction partner and a nickname of an interaction partner, etc.

Figure 3C:
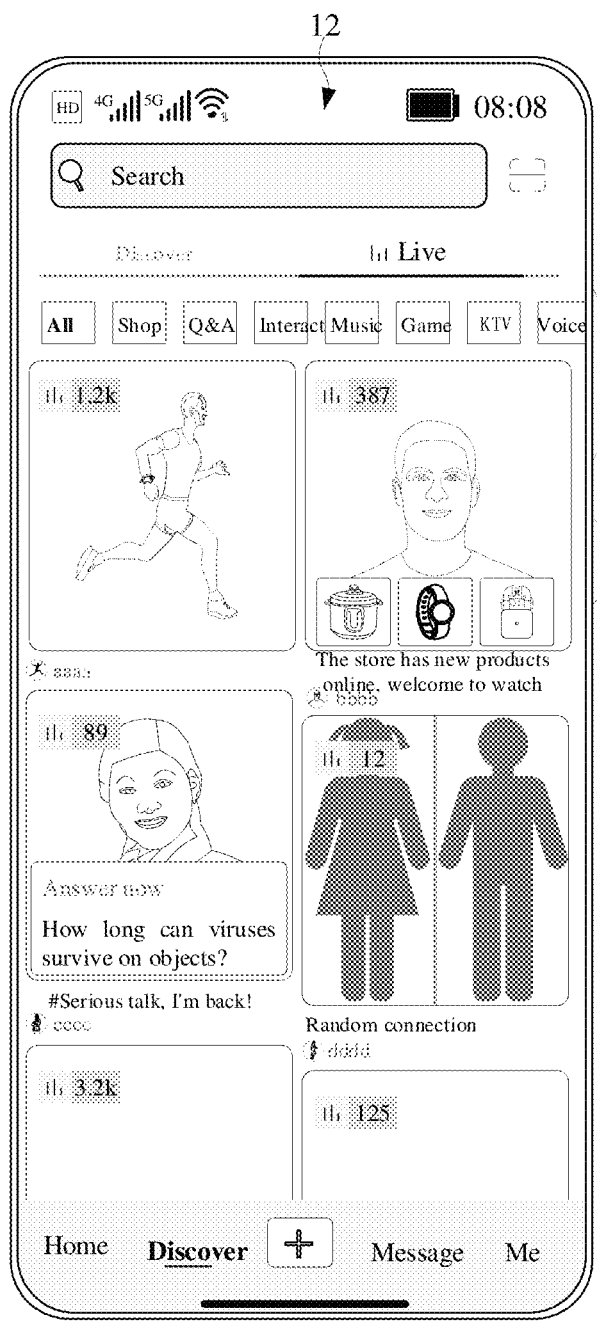

In FIG. 3C, the user interface 12 may comprise an area 105 of the user interface 11 as shown in FIG. 3B. For its specific implementation, reference can be made to the foregoing description, which will not be repeated herein. For ease of explanation, the present disclosure will be discussed below with the livestream page displayed on the user interface 11 of FIG. 3B as an example. 2.2 Update virtual livestream room in style 1 in the livestream page.

After the application 1 receives an update operation from the user 1 that is triggered on the user interface 11 shown in FIG. 3B, the application 1 can update the virtual livestream room shown on the user interface 11 shown in FIG. 3B. The present disclosure does not limit the specific implementation of the update operation.

A. Load More Virtual Livestream Rooms in the Livestream Page

Figure 3D:
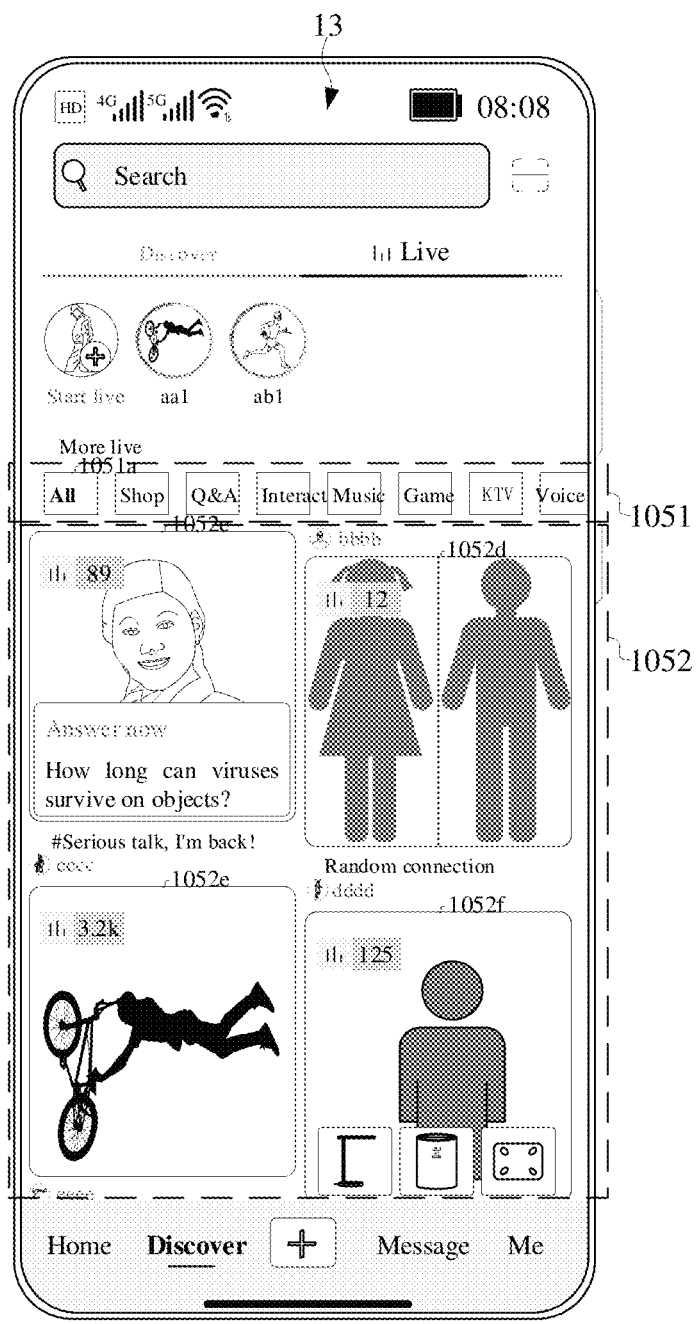

When the user selects control 1051a and the loads virtual livestream room bound to the control 1051a, after the application 1 receives the upward slide operation performed by user 1 at a blank position of area 1052 shown in FIG. 3B, the application 1 can display an exemplary user interface 13 shown in FIG. 3D on the mobile phone. The user interface 13 is configured to display more virtual livestream rooms in the livestream page, for example, a virtual livestream room corresponding to a card 1052e and a virtual livestream room corresponding to a card 1052f.

It can be seen that the user interface 11 displays cards 1052a, 1052b, 1052c and 1052d. When two more virtual livestream rooms respectively corresponding to the card 1052e and the card 1052f are loaded in application 1, the user interface 13 displays the card 1052c, the card 1052d, the card 1052e and the card 1052f in sequence.

It should be noted that no more virtual livestream rooms will be displayed in application 1 when no more virtual livestream rooms can be loaded in the livestream page through the upward slide operation.

To sum up, when the user triggers an operation of loading more virtual livestream rooms in the livestream page, the application 1 can load more virtual livestream rooms, increasing the chance of displaying the virtual livestream rooms.

B. Refresh a Virtual Livestream Room Bound to a Control in the Livestream Page

Figure 3E:
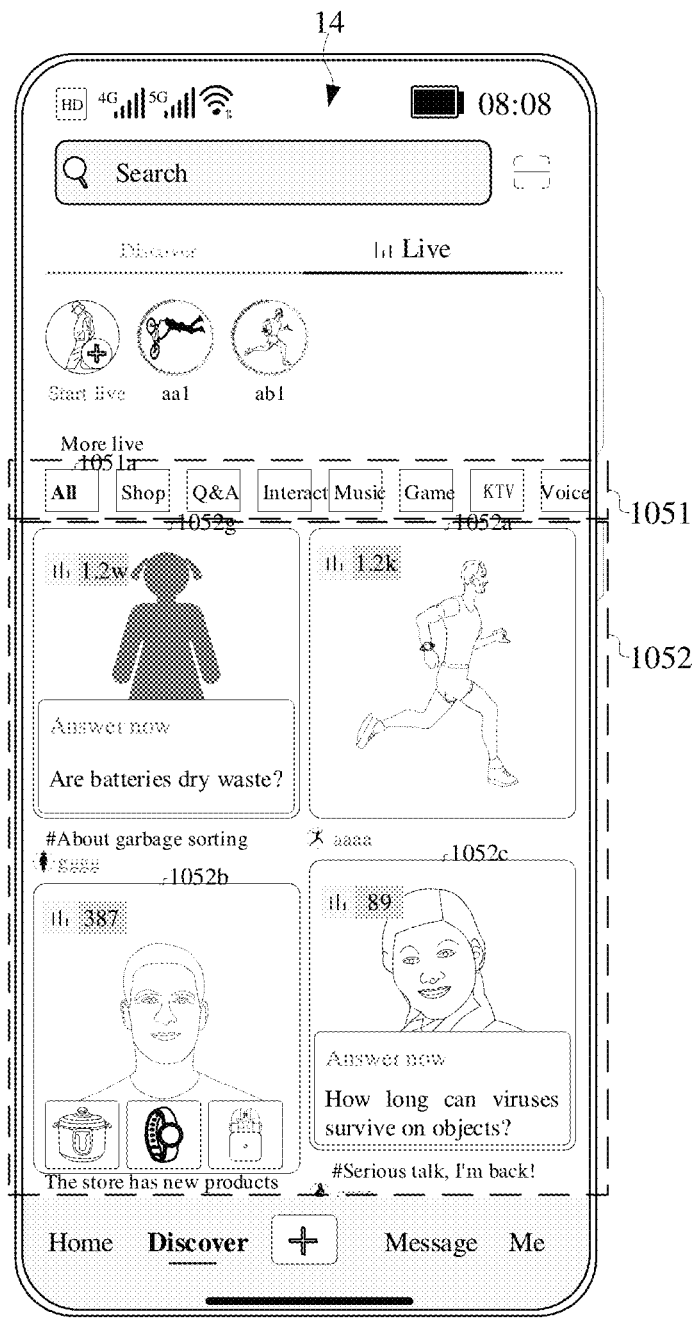
Figure 3F:
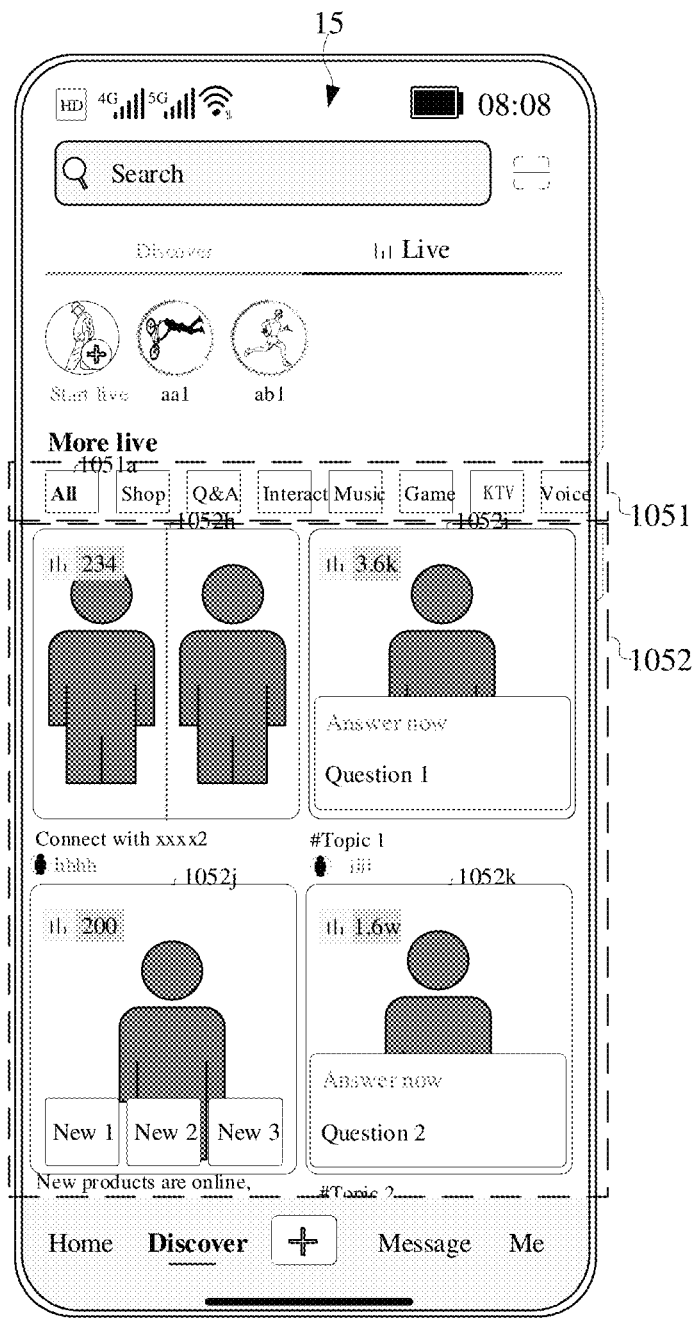
Figure 3G:
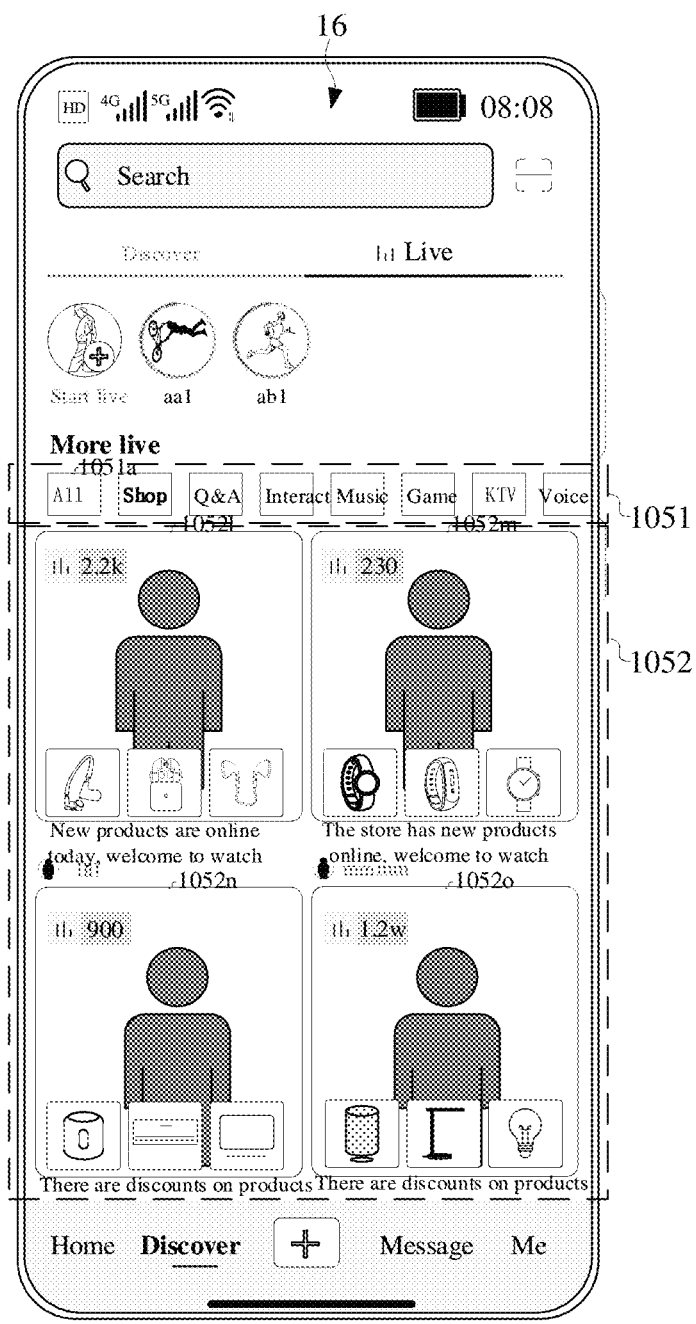

When the user selects the control 1051a and refreshes the virtual livestream room bound to control 1051a, after the application 1 receives an operation performed by user 1 in the area 1051 shown in FIG. 3B such as double-clicking the control 1051a, or, the application 1 receives an operation performed by user 1 in the blank position of area 1052 shown in FIG. 3B such as a downward slide operation, if the number (e.g. 1) of the refreshed virtual livestream room in the livestream page is less than a preset value (e.g. 4) of the virtual livestream room displayed in area 1052, the application 1 can display an exemplary user interface 14 shown in FIG. 3E on the mobile phone; if the number of the refreshed virtual livestream room in the livestream page is greater than or equal to the preset value of the virtual livestream room displayed in area 1052, the application 1 can display an exemplary user interface 15 shown in FIG. 3F on the mobile phone. The user interface 14 and the user interface 15 are configured to display refreshed virtual livestream room in the livestream page, and the user interface 15 displays a refreshed virtual livestream room different from that displayed on user interface 14.

The refreshed virtual livestream room can be understood as a virtual livestream room with a change in the livestream state, such as a livestream state changed from non-on-livestream to on-livestream, and/or from on-livestream to off-livestream. In addition, the display position of the refreshed virtual livestream room is usually located in front of those virtual livestream rooms already displayed in area 1052 (for example, it can be displayed at the starting position of the livestream page), so that the user 1 can view the refreshed virtual livestream room in time.

It should be noted that user interfaces 14 and 15 can display a virtual livestream room in the on-livestream state whiling hiding a virtual livestream room with a livestream state changed from on-livestream to off-livestream. Moreover, when there is no virtual livestream room that will be refreshed in the livestream page, the application 1 can continue to display the user interface 11. In addition, when there are no more refreshed virtual livestream rooms that can be displayed through the upward slide or double click operation, no more refreshed virtual livestream rooms will be displayed in the application 1.

Thus, the user interface 11 displays cards 1052a, 1052b, 1052c and 1052d. When a virtual livestream room corresponding to card 1052g is acquired through the refreshing operation in application 1, the user interface 14 displays cards 1052g, 1052a, 1052b and 1052c in sequence, with the card 1052g displayed at the starting position in the current livestream page, and cards 1052a, 1052b and 1052c displayed in sequence after the display position of card 1052g. If four virtual livestream rooms respectively corresponding to card 1052h, 1052i, 1052j and 1052k are acquired through the refreshing operation in application 1, the user interface 15 displays the card 1052h, 1052i, 1052j and 1052k in sequence.

To sum up, when the user triggers an operation for refreshing the virtual livestream room in the livestream page, the application 1 can refresh a virtual livestream room bound to a control to facilitate the timely display of the refreshed virtual livestream room in the livestream page.

C. Refresh a Virtual Livestream Room Bound to a Different Control in the Livestream Page After the application 1 receives an operation performed by the user 1 in the area 1051 shown in FIG. 3B such as clicking on the control 1051b, the application 1 can display an exemplary user interface 16 shown in FIG. 3G on the mobile phone. The user interface 16 is configured to display the virtual livestream room of the shopping type corresponding to the control 1051b in the livestream page, such as a virtual livestream room corresponding to card 1052l, a virtual livestream room corresponding to card 1052m, a virtual livestream room corresponding to card 1052n and a virtual livestream room corresponding to card 1052o.

Thus, the user interface 11 displays cards 1052a, 1052b, 1052c and 1052d. If four virtual livestream rooms respectively corresponding to cards 1052l, 1052m, 1052n and 1052o are acquired through the refreshing operation in application 1, the user interface 16 displays cards 1052l, 1052m, 1052n, and 1052o in sequence.

To sum up, when the user triggers an operation for displaying a virtual livestream room bond to another control, the application 1 can switch the display of a virtual livestream room bound to one control to the display of a virtual livestream room bound to another control, facilitating the display of various types of virtual livestream rooms in the livestream page.

It should be noted that the user interface 16 can adopt the same update operations as user interface 11 to realize the loading, refreshing and display switching of the virtual livestream rooms. For the specific implementation, reference can be made to the above description, which will not be repeated herein.

Figure 3H:
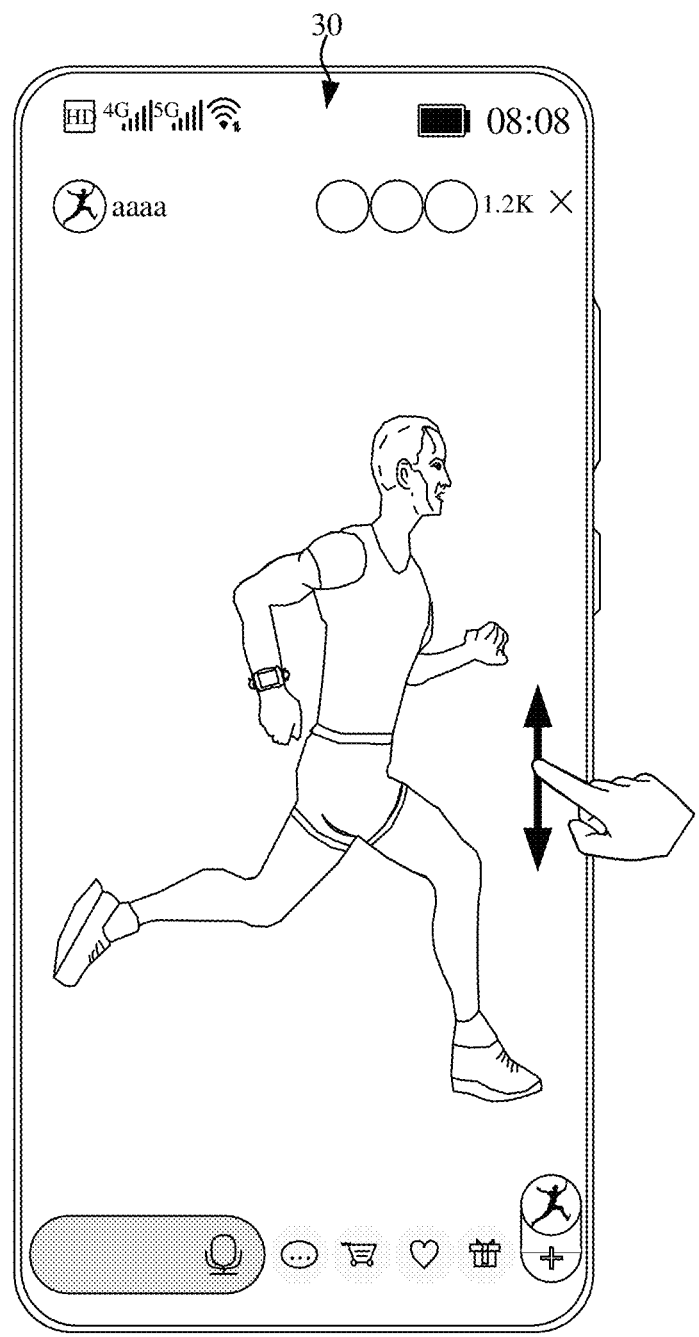

2.3 Switch to a Display Page of a Virtual Livestream Room in Style 1 from the Livestream Page After the application 1 receives an operation such as a click operation on control 1052*a* performed by user 1 in area 1052 shown in FIG. 3B, the application 1 can display an exemplary user interface 30 shown in FIG. 3H on the mobile phone. The user interface 30 is configured to enter a livestream screen of the virtual livestream room corresponding to the card 1052*a*.

In addition, the user interface 30 is further configured to enter a livestream screen of other virtual livestream room. In some embodiments, after the application 1 receives an operation such as an upward slide or downward slide operation performed by the user in the user interface 30 shown in FIG. 3H, the application 1 can display a livestream screen of another virtual livestream room.

To sum up, when the user triggers an operation of entering a virtual livestream room shown in the livestream page, the application 1 can display a livestream screen of the virtual livestream room in a display page, to display the livestream screen of the virtual livestream room to the user in a convenient manner. In the case where style 2 is an information style, the process of the application 1 displaying virtual livestream rooms can comprise:

3.1 Display of Virtual Livestream Room in Style 2 in the Livestream Page

Figure 4A:
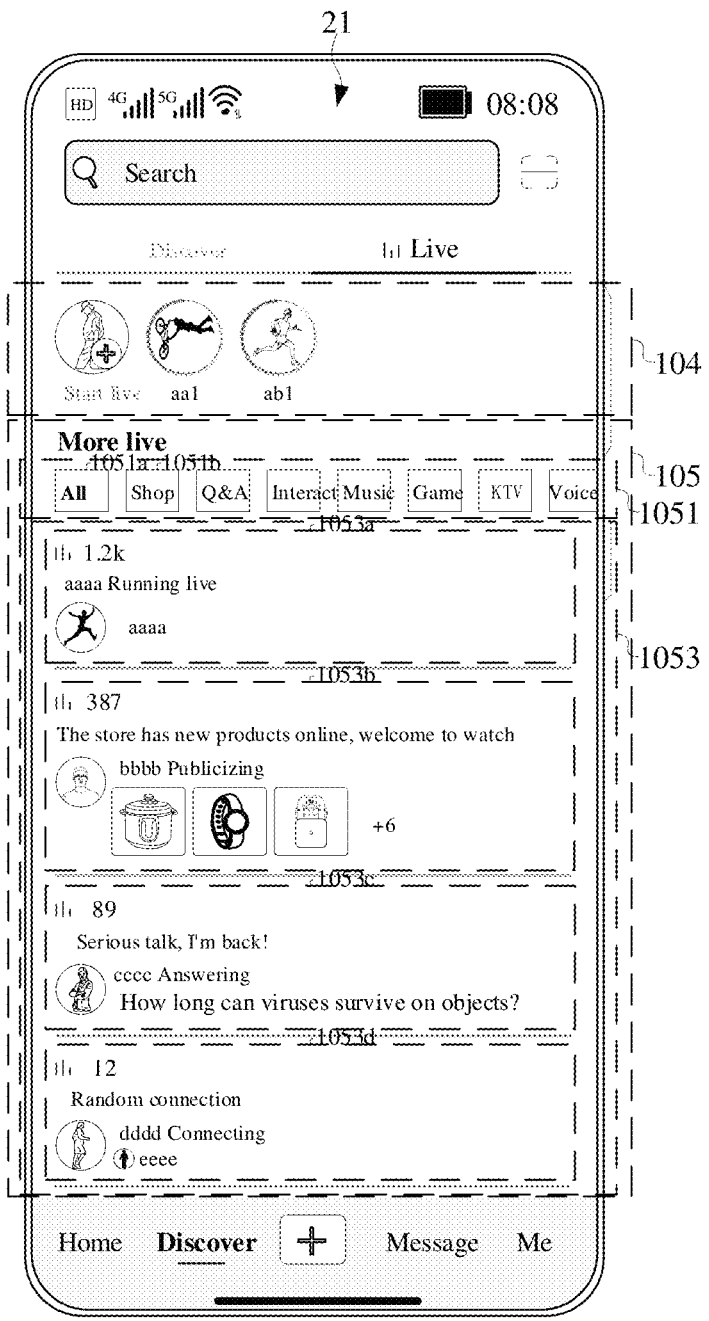
FIGS. 4A to 4F are schematic diagrams of human-computer interaction interfaces provided by an embodiment of the present disclosure.
Figure 4B:
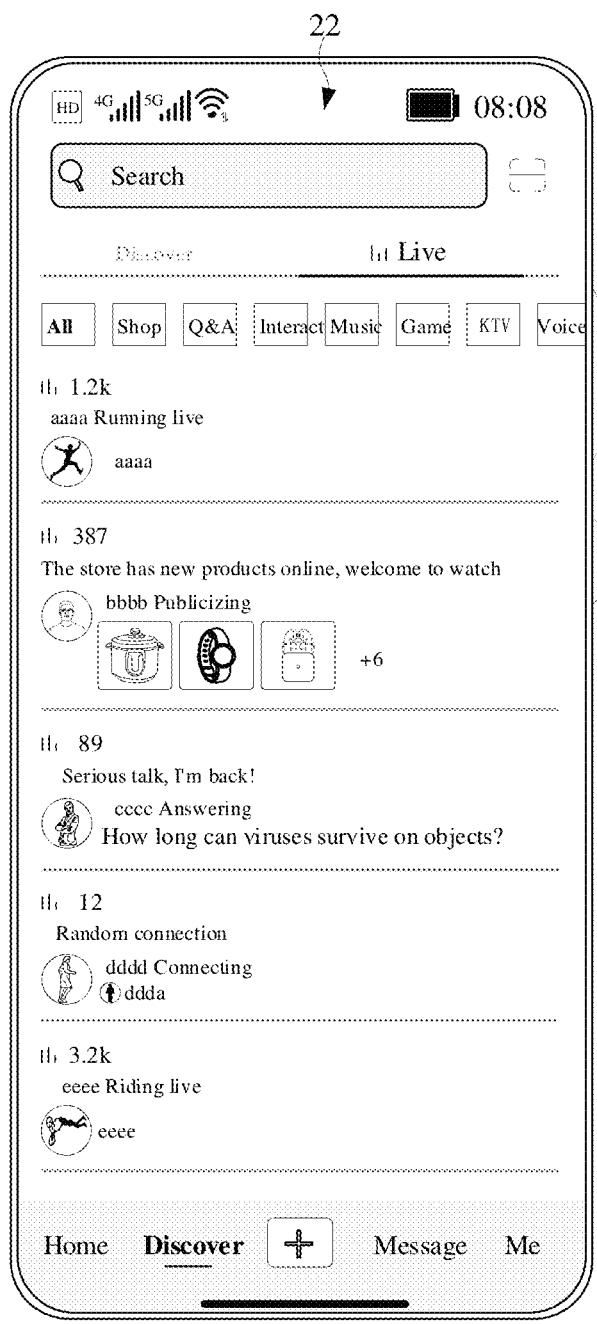

After the application 1 receives an operation from user 1 to trigger the control 103 on user interface 10 shown in FIG. 3A, if there is other user (i.e. the virtual livestream room of other user) followed by user 1 in the application 1 who is in the on-livestream state, the application 1 can display an exemplary user interface 21 shown in FIG. 4A on the mobile phone; if there is no other user (i.e. virtual livestream room of other user) followed by user 1 in the application 1, the application 1 can display an exemplary user interface 22 shown in FIG. 4B on the mobile phone. The user interfaces 21 and 22 are configured to display a virtual livestream room in style 2 in the livestream page.

It should be noted that, in addition to displaying a virtual livestream room that are in the on-livestream state, the user interfaces 21 and 22 can also display a virtual livestream room followed by user 1 in the application 1 that is in an off-livestream state.

In FIG. 4A, the user interface 21 may comprise an area 104 and an area 105.

For the specific implementation of the area 104 in FIG. 4A, reference can be made to the description of the area 104 in FIG. 3B, which will not be described herein.

The area 105 in FIG. 4A may comprise: an area 1051 and an area 1053.

It should be noted that except that the virtual livestream room is displayed in a different style, reference can be made to the description of area 105 in FIG. 3B for the specific implementation of area 105 in FIG. 4A, reference can be made to the description of area 1051 in FIG. 3B for the specific implementation of area 1051 in FIG. 4A, and reference can be made to the description of area 1052 in FIG. 3B for the specific implementation of area 1053 in FIG. 4A, which will not be repeated herein.

In some embodiments, as shown in FIG. 4A, if the user 1 selects the control 1051*a* in the area 1051, the area 1053 may comprise options 1053*a*, 1053*b*, 1053*c* and 1053*d* in style 2.

The option 1053*a* is configured to display the data of a virtual livestream room of the general type, such as the current number of viewers, a title (which can be displayed in full or abbreviated in text), an account avatar of a corresponding user, an account nickname of a corresponding user, and an authentication identifier and so on.

The option 1053*b* is configured to display the data of a virtual livestream room of the shopping type, such as the current number of viewers, a title (which can be displayed in full or abbreviated in text), an account avatar of a corresponding user, an account nickname of a corresponding user, an authentication identifier, an ongoing identification, information about items on sale in real time (for example, some items are exhibited in the selected order and other products are exhibited in put-on-sale order in the shopping cart), the number of items on sale in real time, etc.

The card 1053*c* is configured to display the data of a virtual livestream room of the Q&A type, such as the current number of viewers, a title (which can be displayed in full or abbreviated in text), an account avatar of a corresponding user, an account nickname of a corresponding user, an authentication identifier, an ongoing identification, real-time questions and answers, etc.

The card 1053*d* is configured to display the data of a virtual livestream room of the interaction type, such as the current number of viewers, a title (which can be displayed in full or abbreviated in text), an account avatar of a corresponding user, an account nickname of a corresponding user, an authentication identifier, an ongoing identification, an account avatar of an interaction partner, an account nickname of an interaction partner, etc.

In FIG. 4B, the user interface 22 may comprise area 105 on user interface 21 as shown in FIG. 4A. For its specific implementation, reference can be made to the foregoing description, which will not be repeated herein. For ease of explanation, the present disclosure will be discussed below with the livestream page displayed on the user interface 21 of FIG. 4A as an example.

3.2 Update a Virtual Livestream Room in Style 2 in the Livestream Page

After the application 1 receives an update operation from user 1 that is triggered on user interface 21 shown in FIG. 4A, the application 1 can update the virtual livestream room shown on the user interface 21 of FIG. 4A. The present disclosure does not limit the specific implementation of the update operation.

A. Load More Virtual Livestream Rooms in the Livestream Page

Figure 4C:
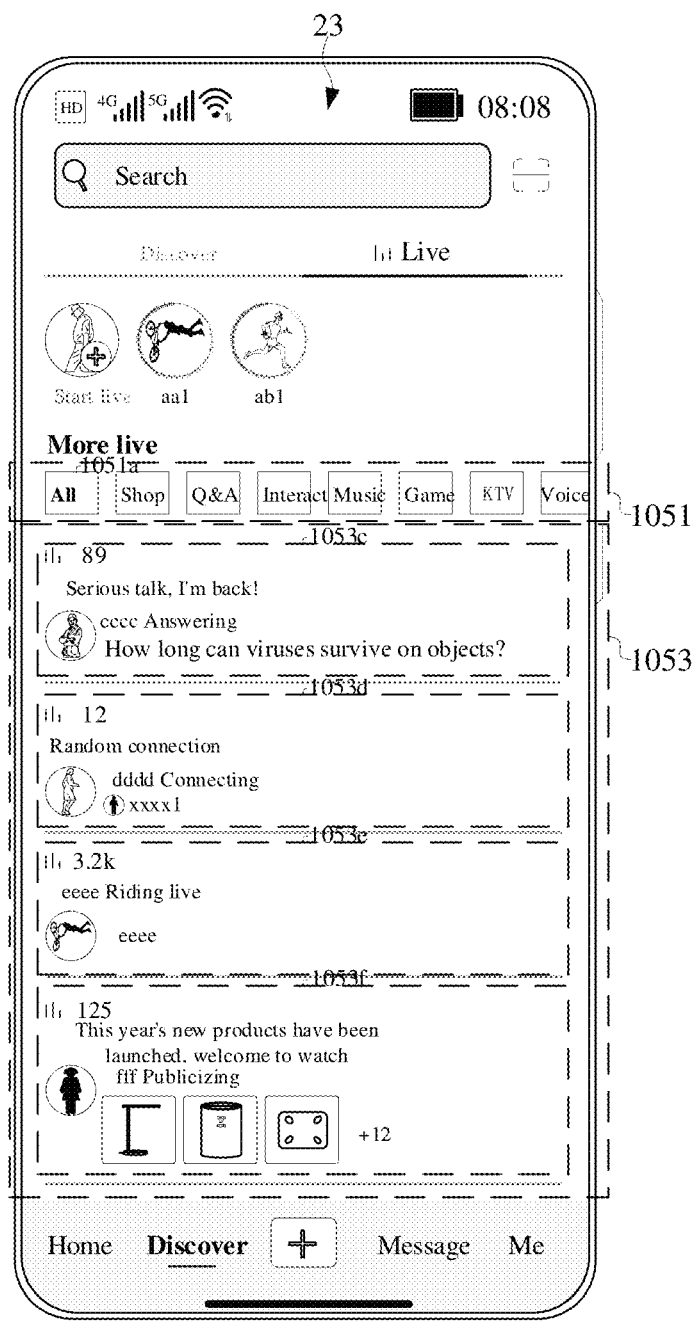

When the user selects control 1051*a* and loads a virtual livestream room bound to the control 1051*a*, after the application 1 receives an operation such as an upward slide operation performed by user 1 at a blank position of area 1053 shown in FIG. 4A, the application 1 can display an exemplary user interface 23 shown in FIG. 4C on the mobile phone. The user interface 23 is configured to display more virtual livestream rooms in the livestream page, for example, a virtual livestream room corresponding to card 1053*e* and a virtual livestream room corresponding to card 1053*f*.

Thus, the user interface 21 displays options 1053*a*, 1053*b*, 1053*c* and 1053*d*. When two more virtual livestream rooms respectively corresponding to cards 1053*e*, 1053*f* are loaded in the application 1, the user interface 23 displays card 1053*c*, card 1053*d*, card 1053*e* and card 1053*f* in sequence.

It should be noted that no more virtual livestream rooms will be displayed in the application 1 when no more virtual livestream rooms can be loaded in the livestream page through the upward slide operation.

To sum up, when the user triggers an operation of loading more virtual livestream rooms in the livestream page, the application 1 can load more virtual livestream rooms, increasing the chance of displaying the virtual livestream rooms.

B. Refresh a Virtual Livestream Room Bound to a Control in the Livestream Page

Figure 4D:
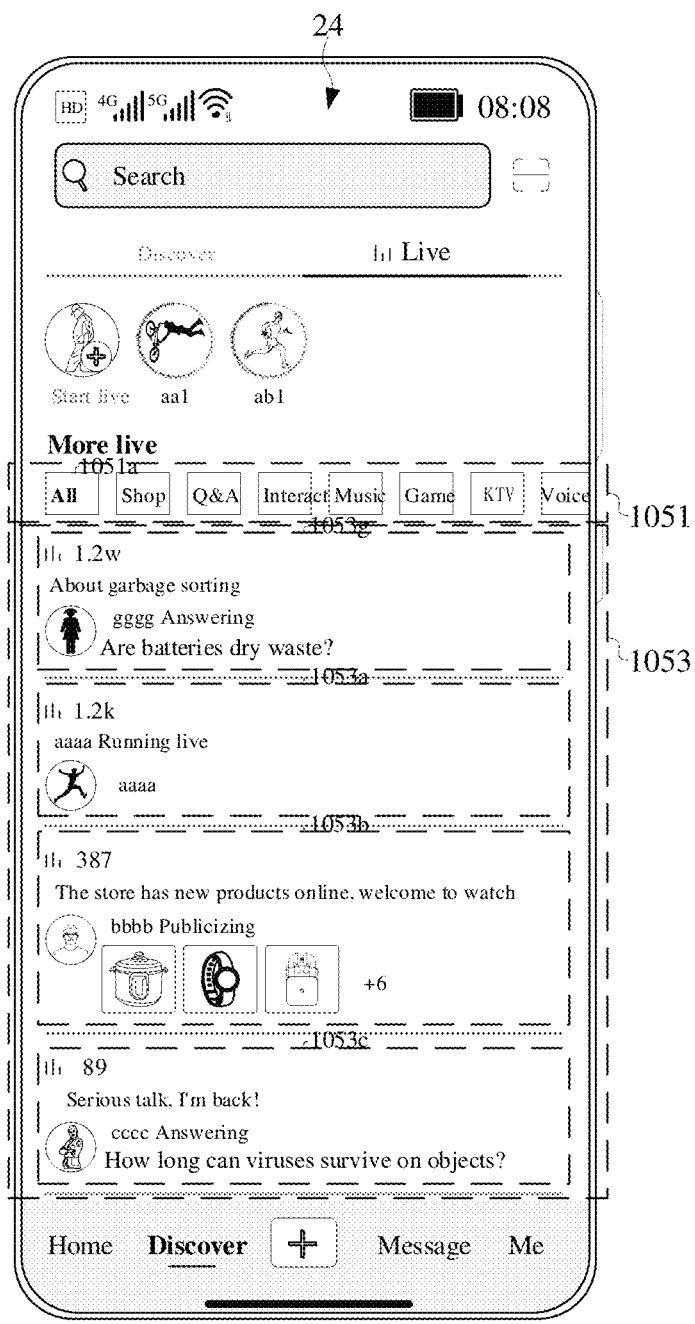
Figure 4E:
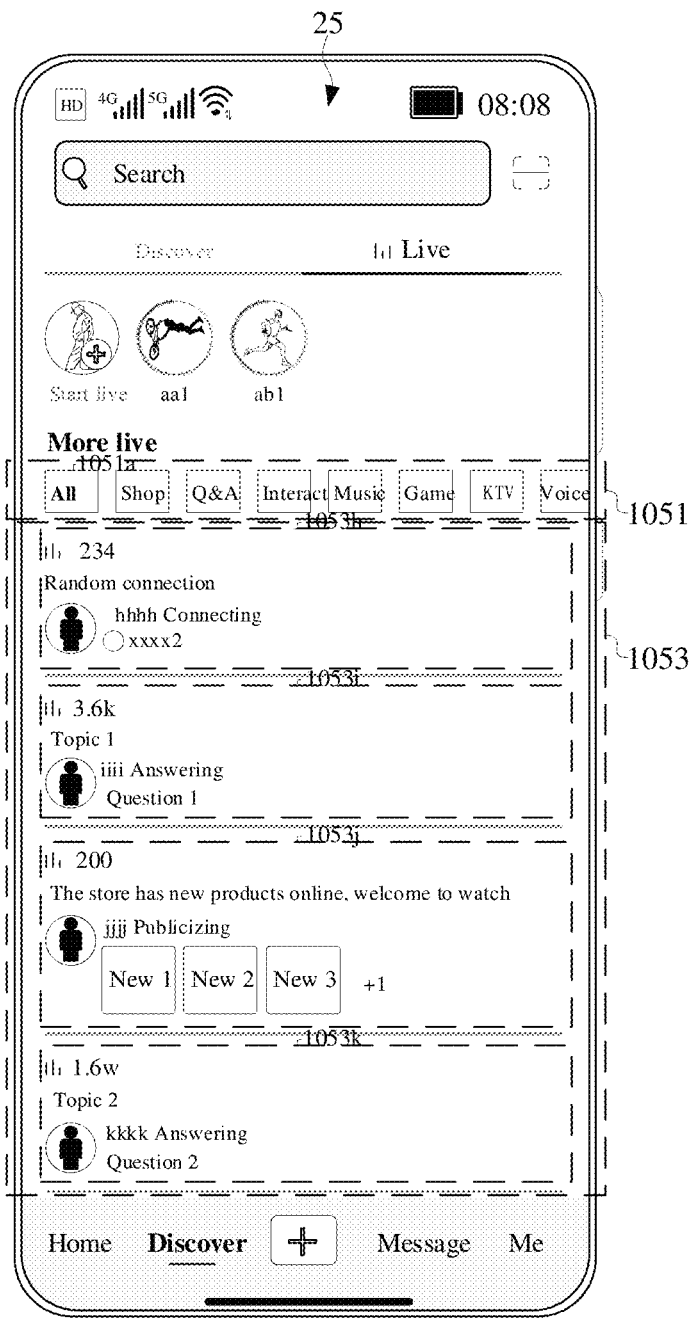

When the user selects control 1051*a* and refreshes a virtual livestream room bound to the control 1051*a*, after the application 1 receives an operation such as a double click operation on control 1051*a* performed by user 1 in area 1051 shown in FIG. 4A, or an operation such as a downward slide operation performed by user 1 at a blank position of area 1053 shown in FIG. 4A, if the number (e.g. 1) of the refreshed virtual livestream room in the livestream page is less than a preset value (e.g. 4) of the virtual livestream room displayed in area 1053, the application 1 can display an exemplary user interface 24 as shown in FIG. 4D on the mobile phone; if the number of the refreshed virtual livestream room in the livestream page is greater than or equal to the preset value of the virtual livestream room displayed in area 1053, the application 1 can display an exemplary user interface 25 as shown in FIG. 4E on the mobile phone. The user interfaces 24 and 25 are configured to display a refreshed virtual livestream room in the livestream page, and the user interface 25 displays a refreshed virtual livestream room different from that displayed on user interface 24.

A refreshed virtual livestream room can be understood as a virtual livestream room with a change in the livestream state, such as a livestream state changed from non-on-livestream to on-livestream, and/or from on-livestream to off-livestream. In addition, the display position of a refreshed virtual livestream room is usually located in front of a virtual livestream room already displayed in area 1053 (for example, it can be displayed at the starting position of the livestream page), so that user 1 can view the refreshed virtual livestream room in time.

It should be noted that user interfaces 24 and 25 can display a virtual livestream room in the on-livestream state whiling hiding a virtual livestream room with a livestream state changed from on-livestream to off-livestream, achieving the effect of removing the virtual livestream room. Moreover, when there is no virtual livestream room that will be refreshed in the livestream page, the application 1 can continue to display the user interface 21. In addition, when there are no more refreshed virtual livestream rooms that can be displayed through the upward slide or double click operation, no more refreshed virtual livestream rooms will be displayed in application 1.

Thus, the user interface 21 displays options 1053*a*, 1053*b*, 1053*c* and 1053*d*. When a virtual livestream room corresponding to card 1053*g* is acquired through the refreshing operation in application 1, the user interface 24 displays options 1053*g*, 1053*a*, 1053*b* and 1053*c* in sequence, with the card 1053*g* displayed at the starting position in the current livestream page, and cards 1053*a*, 1053*b* and 1053*c* displayed in sequence after the display position of the card 1053*g*. If four virtual livestream rooms respectively corresponding to card 1053*h*, 1053*i*, 1053*j* and 1053*k* are acquired through the refreshing operation in application 1, the user interface 25 displays options 1053*h*, 1053*i*, 1053*j* and 1053*k* in sequence.

To sum up, when the user triggers an operation for refreshing the virtual livestream room in the livestream page, the application 1 can refresh the virtual livestream room bound to a control to facilitate the timely display of the refreshed virtual livestream room in the livestream page.

Figure 4F:
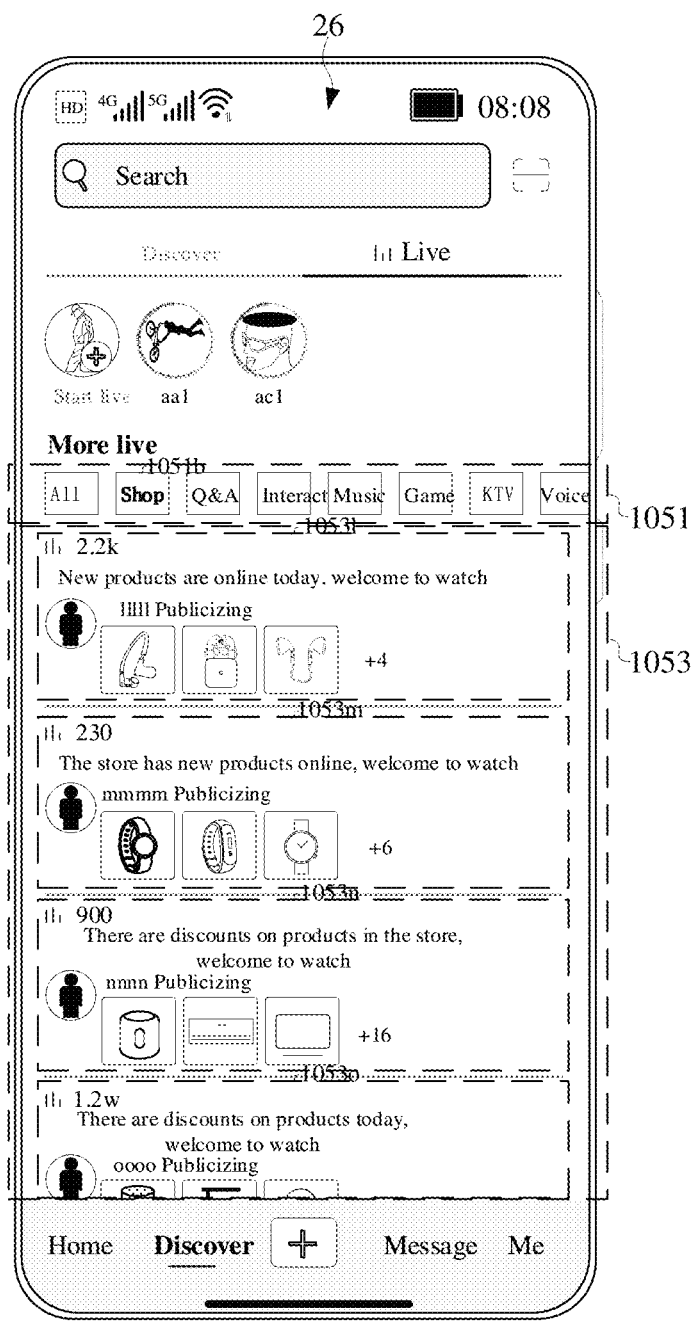

C. Refresh a Virtual Livestream Room Bound to a Different Control in the Livestream Page After the application 1 receives an operation such as a click operation on the control 1051*b* performed by the user 1 in the area 1051 shown in FIG. 4A, the application 1 can display an exemplary user interface 26 as shown in FIG. 4F on the mobile phone. The user interface 26 is configured to display the virtual livestream room of the shopping type corresponding to the control 1051*b* in the livestream page, such as a virtual livestream room corresponding to the option 1053*l*, a virtual livestream room corresponding to the option 1053*m*, a virtual livestream room corresponding to the option 1053*n* and a virtual livestream room corresponding to the option 1053*o*.

Thus, the user interface 21 displays options 1053*a*, 1053*b*, 1053*c* and 1053*d*. If four virtual livestream rooms respectively corresponding to cards 1053*l*, 1053*m*, 1053*n* and 1053*o* are acquired through the refreshing operation in the application 1, the user interface 26 displays cards 1053*l*, 1053*m*, 1053*n*, and 1053*o* in sequence.

To sum up, when the user triggers an operation for displaying a virtual livestream room bond to another control, the application 1 can switch the display of a virtual livestream room bound to one control to the display of a virtual livestream room bound to the other control, facilitating the display of various types of virtual livestream rooms in the livestream page.

It should be noted that the user interface 26 can adopt the same update operations as user interface 21 to realize the loading, refreshing and switching display of the virtual livestream rooms. For the specific implementation, reference can be made to the above description, which will not be repeated herein.

3.3 Switch to a Display Page of a Virtual Livestream Room in Style 2 from the Livestream Page After the application 1 receives an operation such as a click operation on the control 1053*a* performed by user 1 in the area 1053 shown in FIG. 4A, the application 1 can display an exemplary user interface 30 as shown in FIG. 3H on the mobile phone. The user interface 30 is configured to enter a livestream screen of the virtual livestream room corresponding to the option 1053*a*.

In addition, the user interface 30 is further configured to enter a livestream screen of other virtual livestream room. In some embodiments, after the application 1 receives an operation such as an upward slide or downward slide operation performed by the user in the user interface 30 shown in FIG. 3H, the application 1 can display a livestream screen of another virtual livestream room.

To sum up, when the user triggers an operation of entering a virtual livestream room in the livestream page, the application 1 can display a livestream screen of the virtual livestream room in a display page, to display the livestream screen of the virtual livestream room to the user in a convenient manner.

Based on the description of the embodiments in FIGS. 3A-3H and FIGS. 4A-4F, the application 1 can enter the livestream page through the discovery page. When the user triggers an interaction operation for a virtual livestream room, the drawing logic of initially displaying, refreshing or loading more virtual livestream rooms bound to the interaction operation can be realized in the livestream page.

Scenario 2

In Scenario 2, the client can integrate the livestream page into a message page. The livestream page is configured to display a virtual livestream room, and the message page is configured to display a message received by the user in the client, such as a system message sent by the client, a message sent by another user who is followed by the user in the client, or a message sent by another user who is not followed by the user in the client.

Figure 5A:
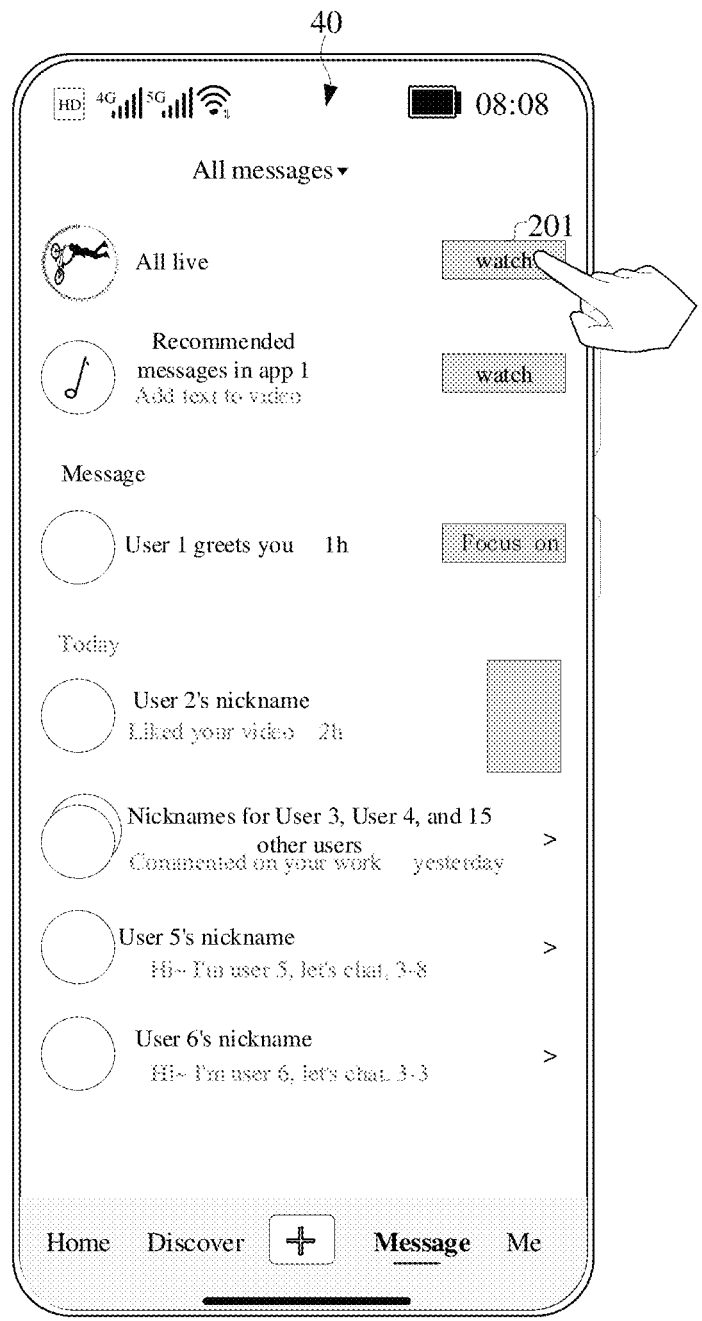
FIGS. 5A to 5C are schematic diagrams of human-computer interaction interfaces provided by an embodiment of the present disclosure.
Figure 5B:
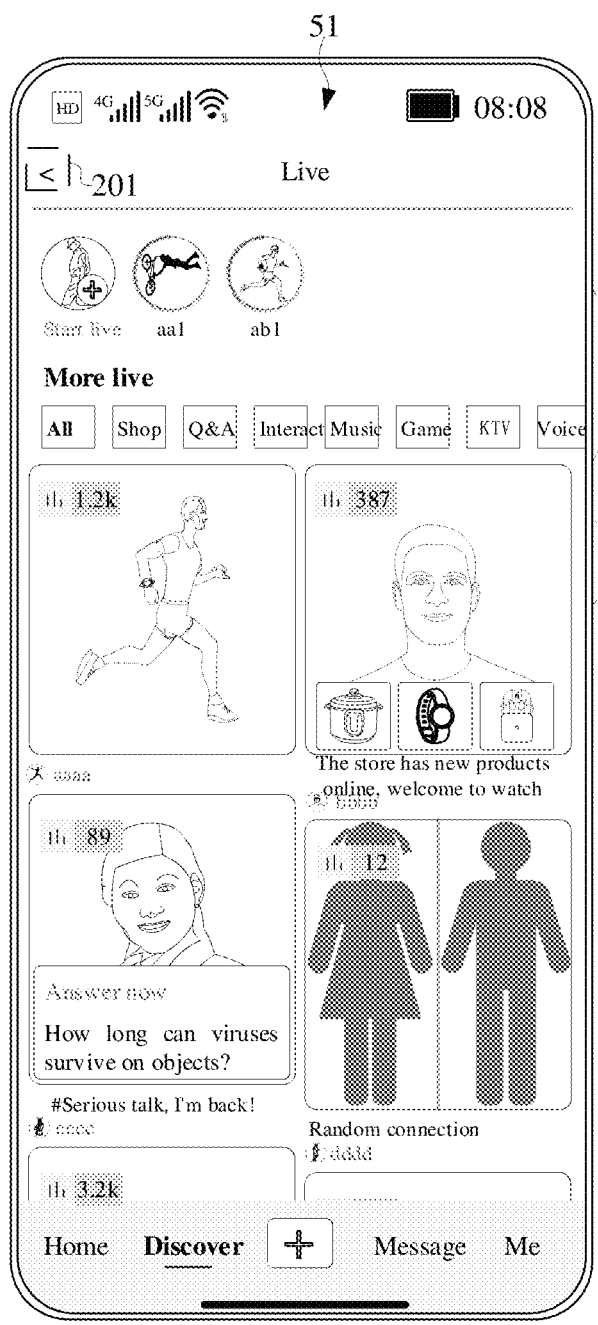
Figure 5C:
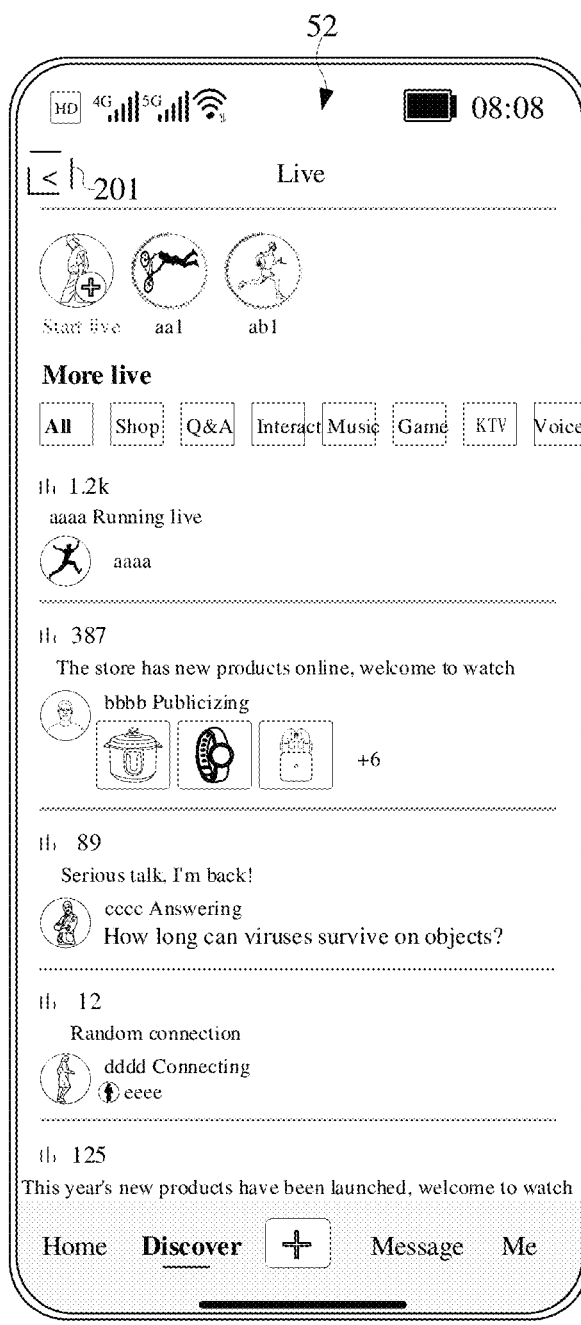

Referring to FIGS. 5A to 5C, these figures are schematic diagrams of human-computer interaction interfaces provided by an embodiment of the present disclosure.

1. Entrance to the Livestream Page

When the mobile phone is in a portrait state, the screen of the mobile phone can display a user interface 40 shown in FIG. 5A, wherein the user interface 40 is configured to display a message page of the application 1.

The user interface 40 comprises a control 201 representing that a user may trigger the control 201 from the user interface 40. The control 201 is configured to trigger the display of the livestream page.

2. Display of a Virtual Livestream Room in Style 1 on the Livestream Page

After the application 1 receives an operation from user 1 to trigger the control 101 on user interface 40 as shown in FIG. 5A, if there is other user (i.e. the virtual livestream room of other user) followed by user 1 in application 1 who is in an on-livestream state, the application 1 can display an exemplary user interface 51 shown in FIG. 5B on the mobile phone. The user interface 51 is configured to display a virtual livestream room in style 1 on the livestream page.

For the specific implementation of user interface 51, reference can be made to the description of the user interface 11 shown in FIG. 3B, which will not be described herein.

3. Display of a Virtual Livestream Room in Style 2 on the Livestream Page

After the application 1 receives an operation from user 1 to trigger the control 101 on the user interface 40 as shown in FIG. 5A, if there is other user (i.e. the virtual livestream room of other user) followed by user 1 in the application 1 who is in an on-livestream state, the application 1 can display an exemplary user interface 52 shown in FIG. 5C on the mobile phone. The user interface 52 is configured to display a virtual livestream room in style 2 on the livestream page.

For the specific implementation of the user interface 52, reference can be made to the description of the user interface 21 shown in FIG. 4A, which will not be described herein.

In addition, FIGS. 5B and 5C may further comprise a control 201 to indicate that the user can trigger the option 201 from the user interface 51 or the user interface 52. The control 201 is configured to trigger the return to the user interface 40, which can realize the display of the message page.

Thus, after the application 1 receives an operation of user 1 triggering the control 201 on the user interface 51 shown in FIG. 5B, or the application 1 receives an operation of user 1 triggering the control 201 on the user interface 52 shown in FIG. 5C, the application 1 can display an exemplary user interface 40 shown in FIG. 5A on the mobile phone.

Based on the description of the embodiments shown in FIGS. 5A to 5C, the application 1 can enter the livestream page through the message page. When the user triggers an interaction operation for a virtual livestream room, the drawing logic of initially displaying, refreshing or loading more virtual livestream rooms bound to the interaction operation can be realized in the livestream page.

In addition, the virtual livestream room in area 104 shown in FIG. 3B, FIGS. 3D-3H, FIG. 4A, FIGS. 3C-4F and FIGS. 5B-5C can be updated when the virtual livestream room in area 105 shown in FIG. 3B, FIGS. 3D-3H, FIG. 4A, FIGS. 3C-4F and FIGS. 5B-5C are updated, or can be updated according to a preset interval, which is not specifically limited herein. In some embodiments, a virtual livestream room in area 104 that are in the off-livestream state can be hidden to realize the removal of the virtual livestream room described above.

It should be noted that, in addition to updating the virtual livestream room in the livestream page, when a livestream content of a virtual livestream room in the livestream page changes, the client can update the livestream content of the virtual livestream room in which its livestream content has changed.

The client can actively obtain the livestream content of a virtual livestream room in the livestream page from the server, or when the livestream content of a virtual livestream room in the livestream page changes, the server can send the livestream content of the virtual livestream room which has a change in the livestream content to the client.

In some embodiments, when the livestream content of a virtual livestream room of the shopping type changes, the client can update and display a livestream screen and/or commodity information of the virtual livestream room in real time (for example, taking FIG. 3B as an example, the commodity cards in 1052b can be updated in real time).

In other embodiments, when the livestream content of a virtual livestream room of the Q&A type changes, the client can update and display the live screen and/or question information of the virtual livestream room (for example, taking FIG. 3B as an example, the question content in 1052c can be updated in real time).

Based on the above description of scenario 1 and scenario 2, taking the server and the client in FIGS. 1 and 2 as an example, and in conjunction with the accompanying drawings and the application scenarios, a method of displaying a virtual livestream room provided by an embodiment of the present disclosure will be described in detail.

Figure 6:
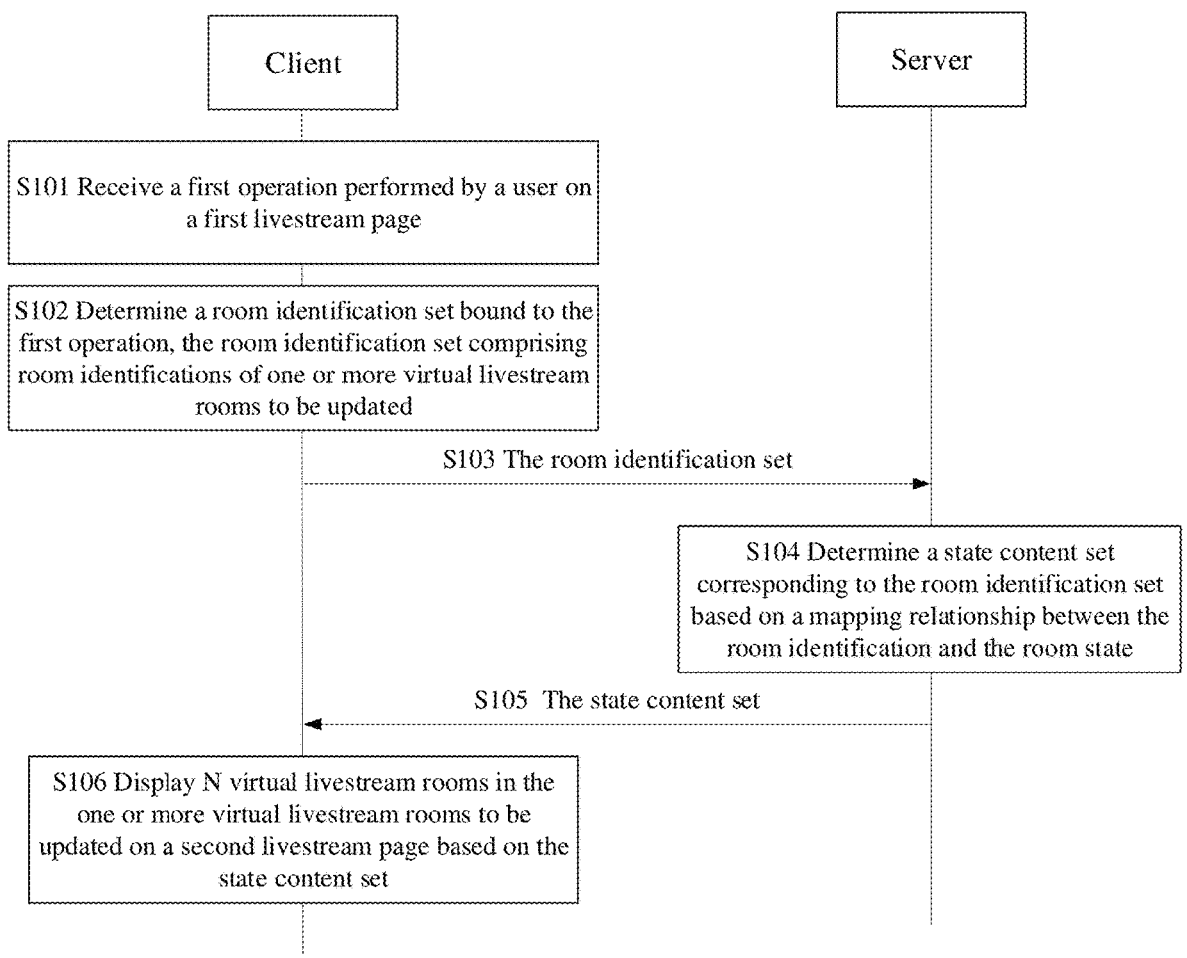
FIG. 6 is a diagram showing a signaling interaction of a method for displaying a virtual livestream room provided by an embodiment of the present disclosure.

Referring to FIG. 6, FIG. 6 is a diagram showing a signaling interaction of a method for displaying a virtual livestream room provided by an embodiment of the present disclosure. As shown in FIG. 6, the method of displaying virtual livestream rooms provided by the present disclosure comprises steps S101 to S106.

At step S101, a client receives a first operation performed by a user on a first livestream page.

The client can display the first livestream page on the screen of a terminal device. The first livestream page is a livestream page in the client, which is configured to display a virtual livestream room.

The present disclosure does not limit the type and display mode of the virtual livestream room on the first livestream page. In some embodiments, the first livestream page can display a virtual livestream room in the on-livestream state to facilitate the user to enter the virtual livestream room in the on-livestream state for real-time interaction.

The user can perform the first operation such as a click, a double click, a long press, a slide, etc. on the screen of the terminal device, so that the terminal device converts the first operation into an instruction corresponding to the first operation and sends it to the client.

At step S102, the client determines a room identification set bound to the first operation, the room identification set comprising room identifications of one or more virtual livestream rooms to be updated.

After receiving an instruction corresponding to the first operation, the client can determine one or more virtual livestream rooms to be updated, that is, one or more virtual livestream rooms bound to the first operation, based on the drawing logic represented by the first operation, such as displaying a virtual livestream room for the first time, refreshing the display of the virtual livestream room, or loading more virtual livestream rooms, and determine a room identification set bound to the first operation based on a mapping relationship between the virtual livestream room and the room identification.

The one or more virtual livestream rooms to be updated are one or more virtual livestream rooms, and there is a binding relationship between the one or more virtual livestream rooms to be updated and the first operation. The one or more virtual livestream rooms to be updated can be bound to the first operation based on a parameter such as the trigger location and/or trigger type of the first operation.

At step S103, the client sends the room identification set to a server.

At step S104, the server determines a state content set corresponding to the room identification set based on a mapping relationship between the room identification and the room state, wherein the room state comprises a livestream state and/or a livestream content state of a virtual livestream room, and the state content set comprises room identifications and relevant information of the one or more virtual livestream rooms to be updated, the relevant information being configured to represent room states and livestream contents of the one or more virtual livestream rooms to be updated. The state content set comprises room identifications and relevant information of the one or more virtual livestream rooms to be updated.

S105: the server sends the state content set to the client.

After determining the room identification set bound to the first operation, the client can send the room identification set bound to the first operation to the server, so as to obtain relevant information of the one or more virtual livestream rooms to be updated, and realize the real-time display of the one or more virtual livestream rooms that need to be updated.

After receiving the room identification set bound to the first operation, the server can determine a room state mapped by each room identification in the room identification set based on the mapping relationship between the room identification and the room state, and determine a state content set corresponding to the room identification set based on room identification and relevant information of the virtual livestream room mapped by the above room state.

Thus, the server can send the state content set to the client, so that the client can update the relevant information of the one or more virtual livestream rooms to be updated in time. The implementation of the server transmitting the state content set is not specifically limited in the present disclosure.

The relevant information of a virtual livestream room can be configured to represent a room state and a livestream content of the virtual livestream room.

In some embodiments, the relevant information of a virtual livestream room comprises a room state. For example, when one virtual livestream room of the one or more virtual livestream rooms to be updated changes from the on-livestream state to the off-livestream state, the relevant information of the one virtual livestream room comprises the off-livestream state of the virtual livestream room.

Alternatively, the relevant information of a virtual livestream room comprises a livestream content. For example, if one virtual livestream room of the one or more virtual livestream rooms to be updated is still in the on-livestream state, and when the livestream content of the one virtual livestream room changes, the relevant information of the one virtual livestream room comprises the livestream content of the virtual livestream room.

Alternatively, the relevant information of a virtual livestream room comprises a room state and a livestream content. For example, when one virtual livestream room of the one or more virtual livestream rooms to on-livestream be updated changes from the non-on-livestream state to the on-livestream state, and the livestream content of the one virtual livestream room changes, the relevant information of the one virtual livestream room comprises: the livestream content of the virtual livestream room.

In some embodiments, the server transmits the room identification and relevant information of each of the one or more virtual livestream rooms to be updated to the client.

In other embodiments, the server transmits the room identification and relevant information of the virtual livestream room whose room status has changed in the one or more virtual livestream rooms to be updated to the client.

For example, the one or more virtual livestream rooms to be updated may be in a state of non-on-livestream, on-livestream, or a transition from on-livestream to off-livestream. Therefore, when the livestream page in the client shows the virtual livestream room in the on-livestream state, the server can send the room identification, livestream state and livestream content of the virtual livestream room with a livestream state changed from non-on-livestream to on-livestream to the client, send the room identification and room state of the virtual livestream room with a livestream state changed from on-livestream to off-livestream to the client, and send the room identification and livestream content of the virtual livestream room that is in the on-livestream state and whose livestream content state has changed to the client. Thus, the amount of data transmission between the server and the client can be reduced.

At step S106, the client displays N virtual livestream rooms in the one or more virtual livestream rooms to be updated on a second livestream page based on the state content set, wherein N is a positive integer.

After receiving the state content set, the client can perform the drawing logic such as initial display, refreshing the display, or load more virtual livestream rooms for the virtual livestream room on the first livestream page based on the room identifications and relevant information of the one or more virtual livestream rooms to be updated comprised in the state content set.

Thus, the client can determine N virtual livestream rooms from the one or more virtual livestream rooms to be updated, display the N virtual livestream rooms on the second livestream page on the screen of the terminal device, and load the relevant information of the N virtual livestream rooms, according to the drawing logic represented by the first operation and the display strategy of the virtual livestream room.

The first livestream page is the livestream page before the update, and the second livestream page is the updated livestream page, wherein the display contents of the second livestream page and the first livestream page can be partially overlapped or completely different. The number of one or more virtual livestream rooms to be updated can be equal to or not equal to N, which can be determined based on the drawing logic and display strategy corresponding to the first operation. The display strategy mentioned in the present disclosure is configured to determine parameters such as the display area and display number of a virtual livestream room on the screen of the terminal device, and can be set based on parameters such as the size of the screen of the terminal device, the room state of the virtual livestream room, the page location of the virtual livestream room, and the number of the virtual livestream room displayed in the livestream page of the client, etc.

In addition, the client can store the state content set to facilitate the above operation.

The method for displaying a virtual livestream room provided by the present disclosure realizes data interaction between the client and the server through the room identification of the virtual livestream room. When a user triggers an interactive operation on a livestream page, the client can determine room identifications of one or more virtual livestream rooms to be updated that are bound to the interactive operation, and send the room identifications of the one or more virtual livestream rooms to be updated to the server. The server queries relevant information of virtual livestream room corresponding to changes in its room state through the room identification of the virtual livestream room, and sends the relevant information of the virtual livestream room to the client, so that the client can quickly locate and modify the relevant information of the virtual livestream room, update the virtual livestream room in the livestream page in time, and refresh data of each virtual livestream room. Thus, the time-consuming of querying the relevant information of the virtual livestream room is optimized, and the load caused by the operating system of the electronic device updating the livestream page is reduced, so that when the user triggers an interactive operation in the livestream page, the client can quickly update the virtual livestream room in the livestream page and the relevant information of the virtual livestream room, enabling the user to quickly obtain data update of the virtual livestream room, and thereby improving the user's experience of using the application.

Based on the description of the embodiment of step S106, the client can display N virtual livestream rooms on the second livestream page in a variety of ways based on the state content set.

Figure 7:
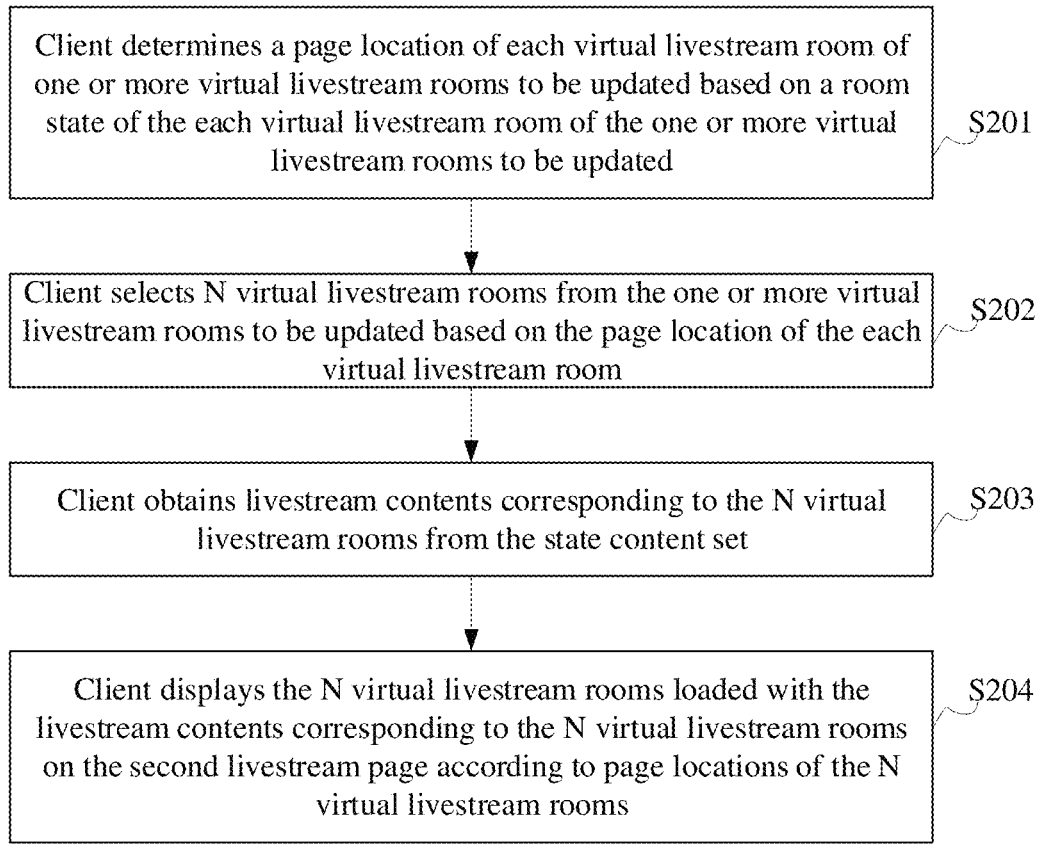
FIG. 7 is a flowchart of a method for displaying a virtual livestream room provided by an embodiment of the present disclosure.

Referring to FIG. 7, FIG. 7 is a flowchart of the method for displaying a virtual livestream room provided by an embodiment of the present disclosure. As shown in FIG. 7, the method of displaying virtual livestream rooms provided by the present disclosure comprises steps S201 to S204.

At step S201, the client determines a page location of each virtual livestream room of the one or more virtual livestream rooms to be updated based on a room state of the each virtual livestream room of the one or more virtual livestream rooms to be updated.

The client can perform location sorting for the one or more virtual livestream rooms to be updated to obtain a page location of each of the one or more virtual livestream rooms to be updated based on the room state of the virtual livestream room and the display strategy of the virtual livestream room.

In some embodiments, the display strategy of the virtual livestream rooms comprises, but is not limited to: displaying the virtual livestream room whose livestream state has changed from non-on-livestream to the off-livestream prior to the displayed virtual livestream room; displaying the virtual livestream room whose livestream content state has changed prior to the virtual livestream room that is in the on-livestream state and whose livestream content state has not changed; hiding the virtual livestream room whose livestream state has changed from on-livestream to off-livestream to realize the removal of virtual livestream room described above.

At step S202, the client selects N virtual livestream rooms from the one or more virtual livestream rooms to be updated based on the page location of the each virtual livestream room.

After determining the page location of each of the one or more virtual livestream rooms to be updated, the client can select the top N virtual livestream rooms from the one or more virtual livestream rooms to be updated according to their page locations as the N virtual livestream rooms. Alternatively, the client can randomly select N virtual livestream rooms from the one or more virtual livestream rooms to be updated. The method of selecting N virtual livestream rooms by the client is not specifically defined in the present disclosure.

At step S203, the client obtains livestream contents corresponding to the N virtual livestream rooms from the state content set.

At step S204, the client displays the N virtual livestream rooms loaded with the livestream contents corresponding to the N virtual livestream rooms on the second livestream page according to page locations of the N virtual livestream rooms.

After determining the N virtual livestream rooms, the client can obtain the livestream content of each of the N virtual livestream rooms from the state content set based on the mapping relationship between the virtual livestream rooms and the relevant information of the virtual livestream rooms. Thus, the client can display the N virtual livestream rooms on the second livestream page according to the page locations of N virtual livestream rooms, while loading the livestream content of each of the N virtual livestream rooms into the corresponding virtual livestream room.

To sum up, the client can determine the page locations of all one or more virtual livestream rooms to be updated, select N virtual livestream rooms from the one or more virtual livestream rooms to be updated, and display the N virtual livestream rooms and their livestream contents in the livestream page. Therefore, the client does not need to obtain the livestream contents of all the one or more virtual livestream rooms to be updated, which can reduce the amount of data invoked by the client.

Based on the description of step S102 of the embodiment, the client can determine a room identification set bound to the first operation in a variety of ways. For example, the binding relationship between each control in the livestream page and the room identification of the virtual livestream room can be established in advance to bind the control and the virtual livestream room.

The client can bind virtual livestream rooms to a control based on the type of the virtual livestream rooms. In some embodiments, the virtual livestream rooms bound to a control may comprise: virtual livestream rooms of all types, such as control 1051a in FIGS. 3B-3G, 4A-4F and 5B-5C, or virtual livestream rooms of the same type, such as control 1051b in FIGS. 3B-3G, 4A-4F and 5B-5C.

Thus, the client can determine a selected control on the first livestream page based on the first operation. The first operation can be an operation acting on the control, or an operation not acting on the control, which is not limited in the present disclosure.

Thus, the client can determine the virtual livestream rooms bound to a control as comprising the one or more virtual livestream rooms to be updated, and determine the room identifications of the virtual livestream rooms bound to the control as the room identification set bound to the first operation.

When the first operation is configured to, after a control is selected, refresh or load the virtual livestream room bound to the control, the client can determine that it is necessary to refresh the display of the virtual livestream room on the first livestream page or load more virtual livestream rooms. In this case, the virtual livestream room bound to the control comprises the virtual livestream room displayed on the first livestream page.

The first operation herein may be implemented in a variety of ways.

In some embodiments, after determining that the user has logged in the application, the client can select a control on the first livestream page by default. In this case, the user can perform a first operation that is used for refreshing or loading a virtual livestream room bound to the control on the first livestream page.

In other embodiments, after determining that the user has logged in the application, the user can select a control on the first livestream page. After the client displays a virtual livestream room bound to the control in the first live room, the user can perform an operation of refreshing or loading a virtual livestream room bound to the control on the first livestream page. Thus, the first operation comprises: an operation of selecting a control and an operation of refreshing or loading a virtual livestream room bound to the control.

Thus, the client can display on a second livestream page: M1 virtual livestream rooms that are in an on-livestream state in the virtual livestream rooms bound to the control other than the virtual livestream rooms displayed on the first livestream page and M2 virtual livestream rooms that are in the on-livestream state in the virtual livestream rooms displayed on the first livestream page, wherein M1+M2=N, M1 and M2 are integers.

For example, when the first operation is configured to, after a control is selected, refresh a virtual livestream room bound to the control, for the specific implementation of the first operation, reference can be made to the operation performed by the user 1 in area 1051 shown in FIG. 3B such as double-clicking the control 1051a, or the operation performed by user 1 at a blank position of area 1052 shown in FIG. 3B such as a downward slide operation. For the specific implementation of the control, reference can be made to control 1052a shown in FIG. 3B. For the specific implementation of the first livestream page, reference can be made to user interface 11 shown in FIG. 3B. For the specific implementation of the second livestream page, reference may be made to user interface 14 shown in FIG. 3E or user interface 15 shown in FIG. 3F. In FIG. 3E, N=4, M1=1, M2=3. In FIG. 3F, N=4, M1=4, M2=0.

Alternatively, when the first operation is configured to, after a control is selected, refresh a virtual livestream room bound to the control, for the specific implementation of the first operation, reference can be made to the operation performed by the user 1 in area 1051 shown in FIG. 4A such as double-clicking the control 1051a, or the operation performed by user 1 at a blank position of area 1053 shown in FIG. 4A such as a downward slide operation. For the specific implementation of the control, reference can be made to control 1053a shown in FIG. 4A. For the specific implementation of the first livestream page, reference can be made to user interface 21 shown in FIG. 4A. For the specific implementation of the second livestream page, reference may be made to user interface 24 shown in FIG. 4D or user interface 25 shown in FIG. 4E. In FIG. 4D, N=4, M1=1, M2=3. In FIG. 4E, N=4, M1=4, M2=0.

For example, when the first operation is configured to, after a control is selected, load a virtual livestream room bound to the control, for the specific implementation of the first operation, reference can be made to the operation performed by the user 1 at a blank position of area 1052 shown in FIG. 3B such as an upward slide operation. For the specific implementation of the control, reference can be made to control 1052a shown in FIG. 3B. For the specific implementation of the first livestream page, reference can be made to user interface 11 shown in FIG. 3B. For the specific implementation of the second livestream page, reference may be made to user interface 13 shown in FIG. 3D. In FIG. 3D, N=4, M1=2, M2=2.

Alternatively, when the first operation is configured to, after a control is selected, load a virtual livestream room bound to the control, for the specific implementation of the first operation, reference can be made to the operation performed by the user 1 at a blank position of area 1053 shown in FIG. 4A such as an upward slide operation. For the specific implementation of the control, reference can be made to control 1053a shown in FIG. 4A. For the specific implementation of the first livestream page, reference can be made to user interface 21 shown in FIG. 4A. For the specific implementation of the second livestream page, reference may be made to user interface 23 shown in FIG. 4C. In FIG. 4C, N=4, M1=2, M2=2.

When the first operation is configured to select a control, the client can determine that it is necessary to switch the display of the virtual livestream room on the first livestream page to the display of the virtual livestream room on the second livestream page (that is, the initial display of the virtual livestream room in the livestream page). In this case, the virtual livestream room bound to the control do not comprise the virtual livestream room displayed on the first livestream page.

The first operation herein may be implemented in a variety of ways.

In some embodiments, after determining that the user has logged in the application, the user can select a control on the first livestream page. Thus, the first operation comprises: an operation of selecting a control.

Thus, the client can display on the second livestream page: N virtual livestream rooms that are in the on-livestream state in the virtual livestream rooms bound to the control.

For example, when the first operation is configured to select a control, for the specific implementation of the first operation, reference can be made to the operation performed by the user 1 in area 1051 shown in FIG. 3B such as clicking the control 1051b. For the specific implementation of the control, reference can be made to control 1051b shown in FIG. 3B. For the specific implementation of the first livestream page, reference can be made to user interface 11 shown in FIG. 3B. For the specific implementation of the second livestream page, reference may be made to user interface 16 shown in FIG. 3G.

Alternatively, when the first operation is configured to select a control, for the specific implementation of the first operation, reference can be made to the operation performed by the user 1 in area 1051 shown in FIG. 4A such as clicking the control 1051b. For the specific implementation of the control, reference can be made to control 1051b shown in FIG. 4A. For the specific implementation of the first livestream page, reference can be made to user interface 21 shown in FIG. 4A. For the specific implementation of the second livestream page, reference may be made to user interface 26 shown in FIG. 4F.

In some embodiments, the client can display a virtual livestream room bound to one control in a livestream page on the livestream page (such as the first livestream page or the second livestream page), and perform relevant operations to prepare the display of a virtual livestream room bound to a remaining control in the livestream page, so as to realize the data preloading of a virtual livestream room bound to the remaining control. The number of the remaining control can be one or more.

For example, for the specific implementation of the first livestream page, reference can be made to the user interface 11 shown in FIG. 3B. For the specific implementation of the control, reference can be made to the control 1051a shown in FIGS. 3B-3F, 4A-4E, and 5B-5C. For the specific implementation of the remaining control, reference may be made to the control 1051b shown in FIGS. 3B-3F, 4A-4E, and 5B-5C.

Alternatively, for the specific implementation of the first livestream page, reference can be made to the user interface 11 shown in FIG. 3B. For the specific implementation of the control, reference can be made to the control 1051b shown in FIGS. 3G and 4F. For the specific implementation of the remaining control, reference may be made to the control 1051a shown in FIGS. 3G and 4F.

Thus, the time for the client to update and display virtual livestream room bound to a trigger operation in the livestream page can be saved.

In some embodiments, the client can display each virtual livestream room in a livestream page (such as the first livestream page or the second livestream page) in a preset style, the preset style comprising at least one of a card, an icon, text, a picture or a video. For the preset style, reference can be made to style 1 in FIGS. 3B-3G and 5B, or style 2 in FIGS. 4A-4F and 5C.

In some embodiments, the virtual livestream rooms can be divided into a virtual livestream room recommended by the client to the user, and a virtual livestream room followed by the user on the client.

When the virtual livestream room to be updated is the virtual livestream room recommended by the client to the user, the client can display the virtual livestream room recommended by the client to the user together with the virtual livestream room followed by the user on the client in the livestream page.

In some embodiments, the client can display the virtual livestream room recommended by the client to the user and the virtual live room followed by the user on the client in different areas. For example, the virtual livestream room recommended by the client to the user can be displayed in area 105 in FIGS. 3B-3G, 4A-4F and 5B-5C, and the virtual livestream room followed by the user on the client can be displayed in area 104 in FIGS. 3B, 3D-3G, 4A, 4C-4F and 5B-5C.

Thus, the livestream page diversity on the client is enriched.

In the present disclosure, the client can update the virtual livestream room with changed livestream content in the livestream page in real time, so that the user can quickly obtain data update in the virtual livestream room.

In some embodiments, the client can determine whether there is a virtual livestream room with a change in the livestream content in the N virtual livestream rooms. Thus, if there is a virtual livestream room with a change in the livestream content in the N virtual livestream rooms, the client can update and display the livestream content of the virtual livestream room with the change in the livestream content.

For example, as shown in FIG. 3A, when the livestream image displayed in the virtual livestream room corresponding to a card 1051a changes, application 1 can update the livestream image in the card 1051a.

When the commodity information displayed in the virtual livestream room corresponding to a card 1052a changes, application 1 can update the commodity information in the card 1052a. When the question content displayed in the virtual livestream room corresponding to a card 1053a changes, application 1 can update the question content in the card 1053a.

In the present disclosure, the client can comprise a variety of entries to the livestream page.

In some embodiments, the client can integrate a livestream page and a discovery page into an integration page. The livestream page is configured to display a virtual livestream room, and the discovery page is configured to provide a function set of the client except the virtual livestream room displayed by the livestream page. For the implementation of the discovery page, reference can be made to the discovery page described above, which will not be repeated herein.

The integration page comprises a first option and a second option, the first option being configured to enter the discovery page, and the second option being configured to enter the livestream page.

The client can switch the display from the livestream page to the discovery page after receiving a second operation performed by the user on the first option.

The client can switch the display from the discovery page to the livestream page after receiving a third operation triggered by the user on the second option.

For example, for the specific implementation of the first option, reference can be made to the option 102 in FIG. 3A, and for the specific implementation of the second option, reference can be made to the option 103 in FIG. 3A.

To sum up, the client can enter the livestream page or the discovery page from a page integrating the discovery page and livestream page, realizing the switching between the discovery page and the livestream page.

In other embodiments, the client may integrate the livestream page in the message page. The livestream page is configured to display a virtual livestream room, and the message page is configured to display a message received by the user on the client. For the specific implementation of the message page, reference can be made to the message page described above, which will not be repeated herein.

The message page comprises a first control configured to enter the livestream page. The livestream page comprises a second control configured to enter the message page.

The client can switch the display from the message page to the livestream page after receiving a fourth operation performed by the user on the first control.

The client can switch the display from the livestream page to the message page after receiving a fifth operation performed by the user on the second control.

For example, for the specific implementation of the first control, reference can be made to the control 201 in FIG. 5A, and for the specific implementation of the second control, reference can be made to the control 202 in FIGS. 5B-5C.

To sum up, the client can enter a livestream page from a message page, and can return to the message page from the livestream page, realizing the switching between the message page and the livestream page.

In some embodiments, the client displays a first livestream page after determining that the user has logged in the client. For the specific implementation of the above process, reference can be made to the description of login on the livestream page through clicking the control 101 shown in FIG. 3A. For the specific implementation of the first livestream page, reference can be made to the description of the livestream page on the user interface 11 shown in FIG. 3B, the user interface 12 shown in FIG. 3C, the user interface 21 shown in FIG. 4A, or the user interface 22 shown in FIG. 4B, which will not be repeated herein.

Based on the description of step S106 of the embodiment, the server can store relevant information of all virtual livestream rooms in the same room state into a query table by establishing a mapping relationship between the room state and the room identification, so that the query table can characterize the mapping relationship between the room identification and the room state. Thus, the server can determine a state content set corresponding to a room identification set through the query table.

Figure 8:
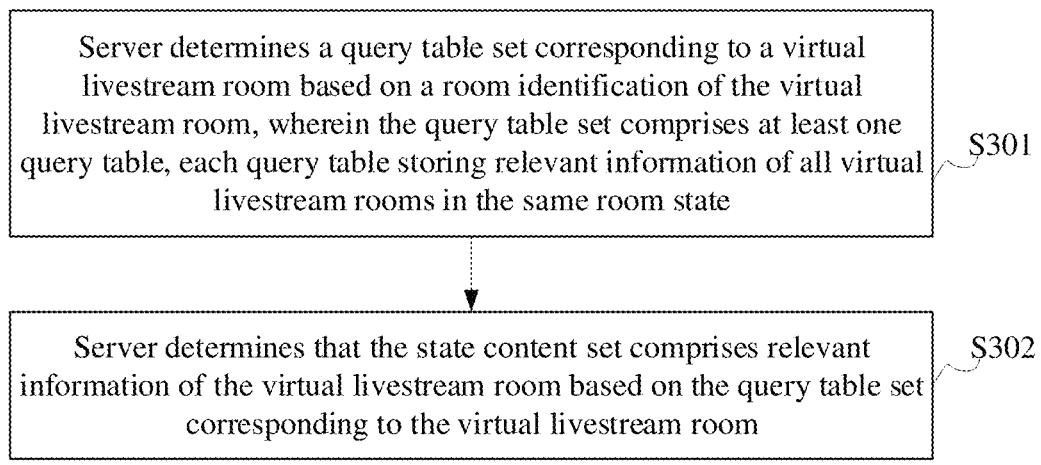
FIG. 8 is a flowchart of a method for displaying a virtual livestream room provided by an embodiment of the present disclosure.

Referring to FIG. 8, FIG. 8 is a flowchart of a method for displaying a virtual livestream room provided by an embodiment of the present disclosure. As shown in FIG. 8, for each of the one or more virtual livestream rooms to be updated, the method of displaying a virtual livestream room provided by the present disclosure comprises steps S301 to S302.

At step S301, a server determines a query table set corresponding to a virtual livestream room based on a room identification of the virtual livestream room, wherein the query table set comprises at least one query table, each query table storing relevant information of all virtual livestream rooms in the same room state.

At step S302, the server determines that the state content set comprises relevant information of the virtual livestream room based on the query table set corresponding to the virtual livestream room.

Through the room identification of a virtual livestream room, the server can determine a query table set corresponding to the mapping relationship between the room state and the room identification of the virtual livestream room. The number of query tables in the query table set may be one or more.

Thus, the server can query relevant information of the virtual livestream room from each query table in the query table set, and determine that the state content set comprises the relevant information of the virtual livestream room.

In some embodiments, when the livestream state of the virtual livestream room displayed in the livestream page is set to the on-livestream state, the server can store the information of all virtual livestream rooms whose room states have changed in a query table, without storing relevant information of the virtual livestream rooms whose room states have not changed.

The server can store a first query table and a second query table. The first query table stores room identifications of all virtual livestream rooms whose livestream states have changed from on-livestream to off-livestream the second query table stores room identifications and livestream contents of all virtual livestream rooms whose livestream contents have changed.

Figure 9:
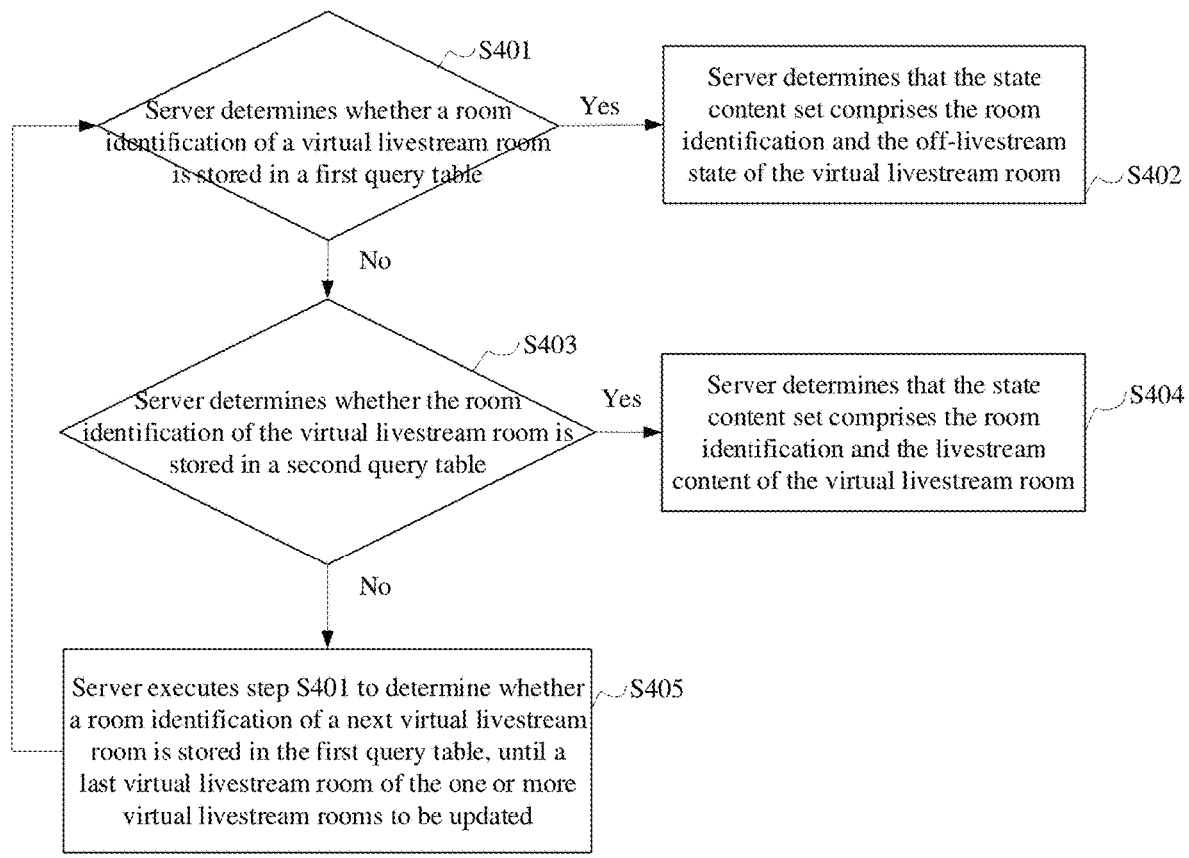
FIG. 9 is a flowchart of a method for displaying a virtual livestream room provided by an embodiment of the present disclosure.

Referring to FIG. 9, FIG. 9 is a flowchart of a method for displaying a virtual livestream room provided by an embodiment of the present disclosure. As shown in FIG. 9, for each of the one or more virtual livestream rooms to be updated, the method of displaying a virtual livestream room provided by the present disclosure comprises steps S401 to S405.

At step S401, a server determines whether the room identification of a virtual livestream room is stored in a first query table.

The first query table stores room identifications of all virtual livestream rooms whose livestream state has changed from an on-livestream to an off-livestream. Therefore, the server can determine whether the room identification of a virtual livestream room is stored in the first query table. The server can store the room identification of a virtual livestream room in the query table in the form of a room identification, a key value between the room identification and the room state, etc.

If the room identification of the virtual livestream room is stored in the first query table, the server executes step S402; if the room identification of the virtual livestream room is not stored in the first query table, the server executes step S403.

At step S402, the server determines that the state content set comprises the room identification and the off-livestream state of the virtual livestream room.

At step S403, the server determines whether the room identification of the virtual livestream room is stored in a second query table.

The second query table stores room identifications of all virtual livestream rooms whose livestream contents have changed. Therefore, the server can determine whether the room identification of the virtual livestream room is stored in the second query table. The server can store the room identification of the virtual livestream room in the query table in the form of a room identification, a key value between the room identification and the room state, etc.

If the room identification of the virtual livestream room is stored in the second query table, the server executes step S404; if the room identification of the virtual livestream room is not stored in the second query table, the server executes step S405.

At step S404, the server determines that the state content set comprises the room identification and the livestream content of the virtual livestream room.

At step S405, the server executes step S401 to determine whether the room identification of a next virtual livestream room is stored in the first query table, until a last virtual livestream room of the one or more virtual livestream rooms to be updated.

To sum up, for each of the one or more virtual livestream rooms to be updated, the server can determine that the state content set comprises the relevant information of all virtual livestream rooms that can be found in the query tables in the one or more virtual livestream rooms to be updated.

It should be noted that if the server sets a query table based on each room state type, for each of the one or more virtual livestream rooms to be updated, the server can find a query table set corresponding to each virtual livestream room. Therefore, the server can determine that the state content set comprises relevant information of all virtual livestream rooms of the one or more virtual livestream rooms to be updated.

As an illustration, the disclosure provides a device for displaying a virtual livestream room.

Figure 10:
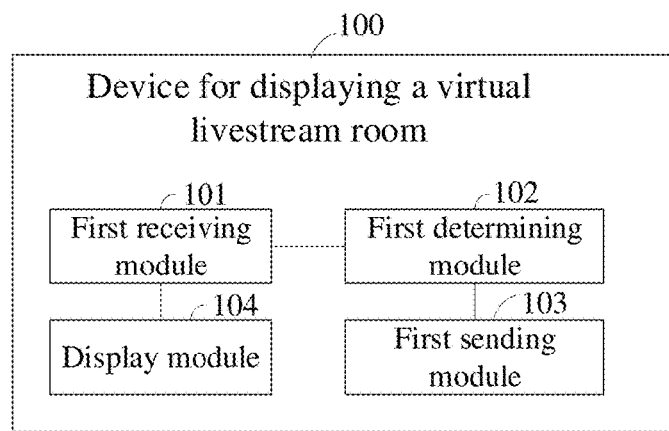
FIG. 10 is a structure diagram of a device for displaying a virtual livestream room provided by an embodiment of the present disclosure.

Referring to FIG. 10, FIG. 10 is a structural diagram of a device for displaying a virtual livestream room provided by an embodiment of the present disclosure. The device for displaying a virtual livestream room of the present disclosure can be provided in a terminal device, and can realize the operations corresponding to the client of the terminal device in the method for displaying a virtual livestream room of the embodiments of FIGS. 1 to 9.

As shown in FIG. 10, the device 100 for displaying a virtual livestream room provided by the present disclosure comprises: a first receiving module 101, a first determining module 102, a first sending module 103 and a display module 104.

The first receiving module 101 is configured to receive a first operation performed by a user on a first livestream page.

The first determining module 102 is configured to determine a room identification set bound to the first operation, the room identification set comprising room identifications of one or more virtual livestream rooms to be updated.

The first sending module 103 is configured to send the room identification set to a server.

The first receiving module 101 is further configured to receive a state content set corresponding to the room identification set from the server, wherein the state content set comprises room identifications and relevant information of the one or more virtual livestream rooms to be updated, the state content set being determined by the server based on a mapping relationship between the room identifications and the room states, the relevant information being configured to represent room states and livestream contents of the one or more virtual livestream rooms to be updated, the room state comprising a livestream state and/or a livestream content state of a virtual livestream room.

The display module 104 is configured to display N virtual livestream rooms in the one or more virtual livestream rooms to be updated on a second livestream page based on the state content set, wherein N is a positive integer.

In some embodiments, the display module 104 is configured to determine a page location of each virtual livestream room of the one or more virtual livestream rooms to be updated based on a room state of the each virtual livestream room of the one or more virtual livestream rooms to be updated; select the N virtual livestream rooms from the one or more virtual livestream rooms to be updated based on the page location of the each virtual livestream room; obtain livestream contents corresponding to the N virtual livestream rooms from the state content set; and display the N virtual livestream rooms loaded with the livestream contents corresponding to the N virtual livestream rooms on the second livestream page according to page locations of the N virtual livestream rooms.

In some embodiments, the first determining module 102 is configured to determine that the room identification set comprises room identifications of virtual livestream rooms bound to a control on the first livestream page, and determining that the one or more virtual livestream rooms to be updated comprises the virtual livestream rooms bound to the control in a case where the first operation is configured to indicate that the control is selected.

In some embodiments, the virtual livestream rooms bound to the control comprises virtual livestream rooms displayed on the first livestream page in a case where the first operation is configured to refresh or load the virtual livestream rooms bound to the control after the control is selected; and the display module 104 is configured to display M1 virtual livestream rooms that are in an on-livestream state in the virtual livestream rooms bound to the control other than the virtual livestream rooms displayed on the first livestream page and M2 virtual livestream rooms that are in the on-livestream state in the virtual livestream rooms displayed on the first livestream page on the second livestream page, wherein M1+M2=N, M1 and M2 are integers.

In some embodiments, the virtual livestream rooms bound to the control do not comprise the virtual livestream rooms displayed on the first livestream page in a case where the first operation is configured to select the control; and the display module 104 is configured to display N virtual livestream rooms that are in an on-livestream state in the virtual livestream rooms bound to the control on the second livestream page.

In some embodiments, the virtual livestream rooms bound to the control comprise: virtual livestream rooms of all room types, or virtual livestream rooms of the same room type.

In some embodiments, the display module 104 is further configured to display a virtual livestream room bound to one control in a livestream page on the livestream page, and perform relevant operations to prepare a display of a virtual livestream room bound to a remaining control in the livestream page.

In some embodiments, the display module 104 is configured to display each virtual livestream room on a livestream page in a preset style, wherein the preset style comprises: at least one of a card, an icon, text, a picture or a video.

In some embodiments, the display module 104 is further configured to determine whether there is a virtual livestream room with a change in livestream content in the N virtual livestream rooms; and update and displaying the livestream content of the virtual livestream room with the change in the livestream content if there is the virtual livestream room with the change in the livestream content in the N virtual livestream rooms.

In some embodiments, the display module 104 is configured to display a virtual livestream room recommended by the client to the user, and a virtual livestream room followed by the user on the client in the livestream page when the one or more virtual livestream rooms to be updated are virtual livestream rooms recommended by the client to the user.

In some embodiments, a livestream page and a discovery page are integrated into an integration page, the discovery page being configured to display a function set in a client except a virtual livestream room displayed by the livestream page, and the livestream page being configured to display the virtual livestream room, and the integration page comprises a first option and a second option, the first option being configured to enter the discovery page, and the second option being configured to enter the livestream page.

The display module 104 is configured to switch a display from the livestream page to the discovery page in response to receiving a second operation performed by the user on the first option; and switch the display from the discovery page to the livestream page in response to receiving a third operation triggered by the user on the second option.

In some embodiments, a message page is configured to display a message received by the user in a client, wherein the message page comprises a first control configured to enter a livestream page, the livestream page being configured to display a virtual live broadcast room and comprising a second control configured to enter the message page.

The display module 107 is configured to switch a display from the message page to the livestream page in response to receiving a fourth operation performed by the user on the first control; and switch the display from livestream page to the message page in response to receiving a fifth operation performed by the user on the second control.

In some embodiments, the display module 104 is configured to display the first livestream page after determining that the user has logged into the client.

The device for displaying a virtual livestream room provided by the present disclosure can execute the above method embodiments. For its specific implementation principle and technical effect, reference can be made to the above method embodiments, which will not be repeated herein.

As an illustration, the disclosure provides a device for displaying a virtual livestream room.

Figure 11:
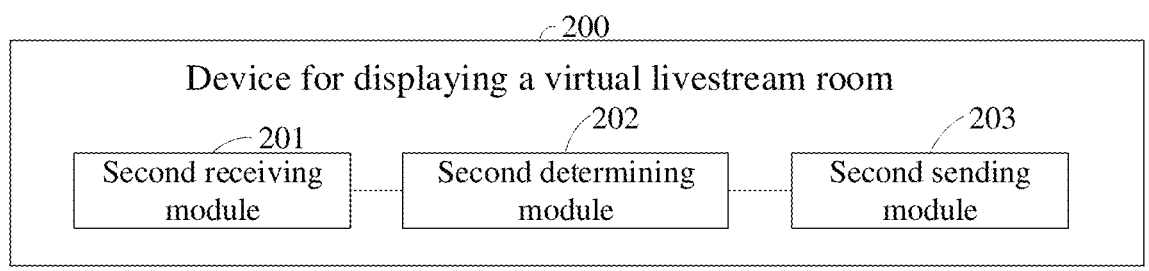
FIG. 11 is a structure diagram of a device for displaying a virtual livestream room provided by an embodiment of the present disclosure.

Referring to FIG. 11, FIG. 11 is a structural diagram of a device for displaying a virtual livestream room provided by an embodiment of the present disclosure. The device for displaying a virtual livestream room of the present disclosure can be provided in a server, and can realize the operations corresponding to the server in the method for displaying a virtual livestream room of the embodiments of FIGS. 1 to 9.

As shown in FIG. 11, a device 200 for displaying a virtual livestream room provided by the present disclosure comprises: a second receiving module 201, a second determining module 202 and a second sending module 203.

The second receiving module 201 is configured to receive a room identification set bound to a first operation from a client, wherein the first operation is an operation received by the client that is performed by a user on a first livestream page, and the room identification set comprises room identifications of one or more virtual livestream rooms to be updated.

The second determining module 202 is configured to determine a state content set corresponding to the room identification set based on a mapping relationship between a room identification and a room state, wherein the room state comprises a livestream state and/or a livestream content state of a virtual livestream room, the state content set comprises room identifications and relevant information of the one or more virtual livestream rooms to be updated, and the relevant information is configured to represent the room states and livestream contents of the one or more virtual livestream rooms to be updated.

The second sending module 203 is configured to send the state content set to the client, so that the client displays N virtual livestream rooms in the one or more virtual livestream rooms to be updated on a second livestream page based on the state content set, wherein N is a positive integer.

In some embodiments, the second determining module 202 is configured to perform the following operations for each virtual livestream room of the one or more virtual livestream rooms to be updated: determining a query table set corresponding to the virtual livestream room based on a room identification of the virtual livestream room, wherein the query table set comprises at least one query table, each query table storing relevant information of all virtual livestream rooms in the same room state; and determining that the state content set comprises the relevant information of the virtual livestream room based on the query table set corresponding to the virtual livestream room.

In some embodiments, the second determining module 202 is configured to determine whether the room identification of the virtual livestream room is stored in a first query table storing room identifications of all virtual livestream rooms whose livestream states have changed from the on-livestream state to an off-livestream state in a case where the livestream state of a virtual livestream room displayed on the first livestream page is the on-livestream state; determine that the state content set comprises the room identification of the virtual livestream room and the off-livestream state of the virtual livestream room if the room identification of the virtual livestream room is stored in the first query table; determine whether the room identification of the virtual livestream room is stored in a second query table storing room identifications and livestream contents of all virtual livestream rooms whose livestream contents have changed if the room identification of the virtual livestream room is not stored in the first query table; and determine that the state content set comprises the room identification of the virtual livestream room and the livestream content of the virtual livestream room if the room identification of the virtual livestream room is stored in the second query table.

The device for displaying a virtual livestream room provided by the present disclosure can execute the above method embodiments. For its specific implementation principle and technical effect, reference can be made to the above method embodiments, which will not be repeated herein.

As an illustration, the present disclosure provides a client, comprising one or more processors; a memory; and one or more computer programs; wherein the one or more computer programs are stored in the memory; wherein the one or more processors, when executing the one or more computer programs, enable the client to implement the method for displaying a virtual livestream room in the foregoing embodiments.

As an illustration, the present disclosure provides a server, comprising one or more processors; a memory; and one or more computer programs; wherein the one or more computer programs are stored in the memory; wherein the one or more processors, when executing the one or more computer programs, enable the server to implement the method for displaying a virtual livestream room in the foregoing embodiments.

An an illustration, the present disclosure provides a chip system applied to an electronic device comprising a display, a memory and a sensor, the chip system comprising: a processor; wherein the processor, when executing computer instructions stored in the memory, enable the electronic device to implement the method for displaying a virtual livestream room in the foregoing embodiments.

As an illustration, the present disclosure provides a non-transitory computer-readable storage medium having stored thereon a computer program that, when executed by a processor, enable an electronic device to implement the method for displaying a virtual livestream room in the foregoing embodiments.

As an illustration, the present disclosure provides a computer program product that, when the computer program product runs on a computer, causes the computer to execute the method for displaying a virtual livestream room in the foregoing embodiments.

In the above embodiment, all or part of the functions can be realized by software, hardware, or a combination thereof. When implemented in software, it can be implemented in whole or in part in the form of a computer program product. The computer program product comprises one or more computer instructions. The computer program instructions, when loaded and executed on a computer, can generate in whole or in part the processes or functions according to embodiments of the present disclosure. The computer may be a general purpose computer, a special purpose computer, a computer network, or other programmable device. The computer instructions may be stored in a computer-readable storage medium. The computer-readable storage medium can be any available medium that can be accessed by a computer or a data storage device such as a server, data center, or the like that contains one or more of the available media integrated therein. The available media may be magnetic media (e.g., floppy disks, hard disks, magnetic tapes), optical media (e.g., DVD), or semiconductor media (e.g., solid state disks (SSD)), or the like.

Note that, in this description, the use of relational terms, if any, such as "first" and "second" and the like are used solely to distinguish one entity or action from another entity or action without necessarily requiring or implying any actual such relationship or order between such entities or actions. Further, terms "comprise", "include" or their any other variations are intended to encompass non-exclusive composition, so that a process, method, product or device comprising a series of factors may comprise not only these factors, but also other factors that are not listed explicitly, or factors intrinsic to this process, method, product or device. Without limitation, a factor defined by wording "comprise one . . . " does not exclude the existence of other same factors in a process, method, product or device comprising such factor.

The above descriptions are only specific embodiments of the present disclosure, so that those skilled in the art can understand or implement the present disclosure. Various modifications to these embodiments will be apparent to those skilled in the art, and the generic principles defined herein may be implemented in other embodiments without departing from the spirit or scope of the present disclosure. Accordingly, the present disclosure should not be limited to the specific embodiments described herein, but should be accorded the broadest scope consistent with the principles and novel features disclosed herein.

What is claimed is:

1. A method for displaying a virtual livestream room, comprising:
receiving a first operation performed by a user on a first livestream page;
determining a room identification set bound to the first operation, the room identification set comprising room identifications of one or more virtual livestream rooms to be updated;
sending the room identification set to a server to obtain relevant information of the one or more virtual livestream rooms to be updated;
receiving a state content set corresponding to the room identification set from the server, wherein the state content set comprises room identifications and the relevant information of the one or more virtual livestream rooms to be updated, the relevant information being configured to represent room states and livestream contents of the one or more virtual livestream rooms to be updated, the state content set being determined by the server based on a mapping relationship between the room identifications and the room states, and each of the room states comprising a livestream state and/or a livestream content state of a virtual livestream room; and
displaying N virtual livestream rooms in the one or more virtual livestream rooms to be updated on a second livestream page based on the state content set, wherein N is a positive integer.

2. The method according to claim 1, wherein the displaying of the N virtual livestream rooms in the one or more virtual livestream rooms to be updated on the second livestream page based on the state content set comprises:
determining a page location of each virtual livestream room of the one or more virtual livestream rooms to be updated based on a room state of the each virtual livestream room of the one or more virtual livestream rooms to be updated;
selecting the N virtual livestream rooms from the one or more virtual livestream rooms to be updated based on the page location of the each virtual livestream room;
obtaining livestream contents corresponding to the N virtual livestream rooms from the state content set; and
displaying the N virtual livestream rooms loaded with the livestream contents corresponding to the N virtual livestream rooms on the second livestream page according to page locations of the N virtual livestream rooms.

3. The method according to claim 1, wherein the determining of the room identification set bound to the first operation comprises:
determining that the room identification set comprises room identifications of virtual livestream rooms bound to a control on the first livestream page, and determining that the one or more virtual livestream rooms to be updated comprises the virtual livestream rooms bound to the control in a case where the first operation is configured to indicate that the control is selected.

4. The method according to claim 3, wherein the virtual livestream rooms bound to the control comprises virtual livestream rooms displayed on the first livestream page in a case where the first operation is configured to refresh or load the virtual livestream rooms bound to the control after the control is selected; and
the displaying of the N virtual livestream rooms in the one or more virtual livestream rooms to be updated on the second livestream page comprises:
displaying M1 virtual livestream rooms that are in an on-livestream state in the virtual livestream rooms bound to the control other than the virtual livestream rooms displayed on the first livestream page and M2 virtual livestream rooms that are in the on-livestream state in the virtual livestream rooms displayed on the first livestream page on the second livestream page, wherein M1+M2=N, M1 and M2 are integers.

5. The method according to claim 3, wherein the virtual livestream rooms bound to the control do not comprise the virtual livestream rooms displayed on the first livestream page in a case where the first operation is configured to select the control;
the displaying of the N virtual livestream rooms in the one or more virtual livestream rooms to be updated on the second livestream page comprises:
displaying N virtual livestream rooms that are in an on-livestream state in the virtual livestream rooms bound to the control on the second livestream page.

6. The method according to claim 3, wherein the virtual livestream rooms bound to the control comprise: virtual livestream rooms of all room types, or virtual livestream rooms of the same room type.

7. The method according to claim 3, further comprising:
displaying a virtual livestream room bound to one control in a livestream page on the livestream page, and performing relevant operations to prepare a display of a virtual livestream room bound to a remaining control in the livestream page.

8. The method according to claim 1, wherein each virtual livestream room is displayed on a livestream page in a preset style, wherein the preset style comprises: at least one of a card, an icon, text, a picture or a video.

9. The method according to claim 1, further comprising:
determining whether there is a virtual livestream room with a change in livestream content in the N virtual livestream rooms; and
updating and displaying the livestream content of the virtual livestream room with the change in the livestream content if there is the virtual livestream room with the change in the livestream content in the N virtual livestream rooms.

10. The method according to claim 1, wherein:
a livestream page and a discovery page are integrated into an integration page, the livestream page being configured to display a virtual livestream room, and the discovery page being configured to display a function set of a client except the virtual livestream room displayed by the livestream page, and the integration page comprises a first option and a second option, the first option being configured to enter the discovery page, and the second option being configured to enter the livestream page; and the method further comprises:
switching a display from the livestream page to the discovery page in response to receiving a second operation performed by the user on the first option; and
switching the display from the discovery page to the livestream page in response to receiving a third operation triggered by the user on the second option.

11. The method according to claim 1, wherein:
a message page is configured to display a message received by the user in a client, wherein the message page comprises a first control configured to enter a livestream page, the livestream page comprising a second control configured to enter the message page, and the livestream page being configured to display a virtual live broadcast room; and the method further comprises:
switching a display from the message page to the livestream page in response to receiving a fourth operation performed by the user on the first control; and
switching the display from livestream page to the message page in response to receiving a fifth operation performed by the user on the second control.

12. The method according to claim 1, further comprising:
displaying the first livestream page after determining that the user has logged into a client.

13. A method for displaying a virtual livestream room, comprising:
receiving a room identification set bound to a first operation from a client, wherein the first operation is an operation received by the client that is performed by a user on a first livestream page, and the room identification set comprises room identifications of one or more virtual livestream rooms to be updated;
determining a state content set corresponding to the room identification set based on a mapping relationship between room identifications and room states, wherein each of the room states comprises a livestream state and/or a livestream content state of a virtual livestream room, the state content set comprises room identifications and relevant information of the one or more virtual livestream rooms to be updated, and the relevant information is configured to represent the room states and livestream contents of the one or more virtual livestream rooms to be updated; and
sending the state content set to the client to make the client obtain the relevant information of the one or more virtual livestream rooms to be updated, so that the client displays N virtual livestream rooms in the one or more virtual livestream rooms to be updated on a second livestream page based on the state content set, wherein N is a positive integer.

14. The method according to claim 13, wherein the determining of the state content set corresponding to the room identification set based on the mapping relationship between the room identifications and the room states comprises:
for each virtual livestream room of the one or more virtual livestream rooms to be updated, performing the following operations:
determining a query table set corresponding to the each virtual livestream room based on a room identification of the each virtual livestream room, wherein the query table set comprises at least one query table, each query table storing relevant information of all virtual livestream rooms in the same room state; and
determining that the state content set comprises the relevant information of the each virtual livestream room based on the query table set corresponding to the each virtual livestream room.

15. The method according to claim 14, wherein when livestream states of virtual livestream rooms displayed on the first livestream page are set to an on-livestream state, for each virtual livestream room of the one or more virtual livestream rooms to be updated, the following operations are performed:
determining whether the room identification of the each virtual livestream room is stored in a first query table storing room identifications of all virtual livestream rooms whose livestream states have changed from the on-livestream state to an off-livestream state;
determining that the state content set comprises the room identification of the each virtual livestream room and the off-livestream state of the each virtual livestream room if the room identification of the each virtual livestream room is stored in the first query table;
determining whether the room identification of the each virtual livestream room is stored in a second query table storing room identifications and livestream contents of all virtual livestream rooms whose livestream contents have changed if the room identification of the each virtual livestream room is not stored in the first query table; and
determining that the state content set comprises the room identification of the each virtual livestream room and the livestream content of the each virtual livestream room if the room identification of the each virtual livestream room is stored in the second query table.

16. A client, comprising:
one or more processors;
a memory; and
one or more computer programs;
wherein the one or more computer programs are stored in the memory, and the one or more processors, when executing the one or more computer programs, enable the client to implement the method for displaying a virtual livestream room according to claim 1.

17. A server, comprising:
one or more processors;
a memory; and
one or more computer programs;
wherein the one or more computer programs are stored in the memory, and the one or more processors, when executing the one or more computer programs, enable the server to implement the method for displaying a virtual livestream room according to claim 13.

18. A non-transitory computer storage medium, comprising computer instructions, which when executed on an electronic device cause the electronic device to execute the method for displaying a virtual livestream room according to claim 1.

19. A non-transitory computer storage medium, comprising computer instructions, which when executed on an electronic device cause the electronic device to execute the method for displaying a virtual livestream room according to claim 13.

* * * * *